United States Patent
Bikson et al.

(10) Patent No.: US 9,623,369 B2
(45) Date of Patent: Apr. 18, 2017

(54) HOLLOW FIBER APPARATUS AND USE THEREOF FOR FLUIDS SEPARATIONS AND HEAT AND MASS TRANSFERS

(75) Inventors: Benjamin Bikson, Newton, MA (US); Stephen Etter, Hamden, CT (US); Nathaniel Ching, Middletown, NJ (US)

(73) Assignees: POROGEN CORPORATION, Woburn, MA (US); VALCOR ENGINEERING CORPORATION, Springfield Township, NJ (US)

( * ) Notice: Subject to any disclaimer, the term of this patent is extended or adjusted under 35 U.S.C. 154(b) by 320 days.

(21) Appl. No.: 13/492,757

(22) Filed: Jun. 8, 2012

(65) Prior Publication Data

US 2013/0081537 A1    Apr. 4, 2013

Related U.S. Application Data

(63) Continuation-in-part of application No. 13/411,548, filed on Mar. 3, 2012.
(Continued)

(51) Int. Cl.
*B01D 53/22* (2006.01)
*F28D 15/00* (2006.01)
(Continued)

(52) U.S. Cl.
CPC ............. *B01D 53/228* (2013.01); *B01D 1/22* (2013.01); *B01D 63/02* (2013.01); *B64D 37/32* (2013.01);
(Continued)

(58) Field of Classification Search
CPC ........ B01D 53/228; B01D 1/22; B01D 63/02; B01D 2313/10; B01D 2313/12;
(Continued)

(56) References Cited

U.S. PATENT DOCUMENTS 3,422,008 A    1/1969 McLain
3,690,465 A    9/1972 McGinnis et al.
(Continued)

FOREIGN PATENT DOCUMENTS

EP    0798034 A1    10/1997
EP    1108458 A1    6/2001
(Continued)

OTHER PUBLICATIONS

"Borehole" American Heritage Dictionary of the English Language, Fifth Edition. 2011 by Houghton Mifflin Harcourt Publishing Company <http://www.thefreedictionary.com/borehole>.*
(Continued)

*Primary Examiner* — Anthony Shumate
(74) *Attorney, Agent, or Firm* — Christopher J. Cronin

(57) ABSTRACT

A hollow fiber fluid separation device includes a hollow fiber cartridge, comprising a plurality of hollow fiber membranes arranged around a central tubular core, a first tubesheet and a second tubesheet encapsulating respective distal ends of the hollow fiber bundle. The tubesheets have boreholes in fluid communication with bores of the hollow fiber membrane. In at least one of the tubesheets, the boreholes are formed radially and are in communication with the central tubular core. The hollow fiber fluid separation device can be utilized in liquid separation applications such as ultrafiltration and in gas separation processes such as air separation. The design disclosed herein is light weight and compact and is particularly advantageous at high operating temperatures when the pressure of the feed fluid introduced into the bores of hollow fibers is higher than the pressure on the shell side of the device.

25 Claims, 15 Drawing Sheets

Related U.S. Application Data

(60) Provisional application No. 61/494,867, filed on Jun. 8, 2011.

(51) Int. Cl.

| | | |
|---|---|---|
| *F28F 1/00* | (2006.01) | |
| *B01D 1/22* | (2006.01) | |
| *B64D 37/32* | (2006.01) | |
| *F28F 21/06* | (2006.01) | |
| *F28D 7/16* | (2006.01) | |
| *B01D 63/02* | (2006.01) | |
| *F28F 9/02* | (2006.01) | |
| *F28D 7/02* | (2006.01) | |
| *F28D 21/00* | (2006.01) | |

(52) U.S. Cl.
CPC ........... *F28D 7/024* (2013.01); *F28D 7/1669* (2013.01); *F28D 15/00* (2013.01); *F28D 21/0015* (2013.01); *F28F 1/00* (2013.01); *F28F 9/026* (2013.01); *F28F 21/062* (2013.01); *B01D 2313/10* (2013.01); *B01D 2313/12* (2013.01); *F28D 2021/0021* (2013.01); *Y02T 50/44* (2013.01); *Y10T 428/139* (2015.01); *Y10T 428/1393* (2015.01)

(58) Field of Classification Search
CPC ....... B64D 37/32; F28D 7/024; F28D 7/1669; F28D 15/00; F28D 21/0015; F28D 2021/0021; F28F 1/00; F28F 9/026; F28F 21/062; Y10T 428/139; Y10T 428/1393; Y02T 50/44
USPC .............................. 95/43, 45, 54; 96/7, 8, 10
See application file for complete search history.

(56) References Cited

U.S. PATENT DOCUMENTS

| | | | |
|---|---|---|---|
| 3,755,034 A | | 8/1973 | Mahon et al. |
| 3,794,468 A | | 2/1974 | Leonard |
| 4,061,574 A | | 12/1977 | Clark |
| 4,080,296 A | | 3/1978 | Clark |
| 4,207,192 A | | 6/1980 | Coplan et al. |
| 4,336,138 A | | 6/1982 | Taniyama et al. |
| 4,652,373 A | | 3/1987 | Trimmer |
| 4,671,809 A | * | 6/1987 | Taketomo et al. .................. 96/8 |
| 4,881,955 A | | 11/1989 | Bikson et al. |
| 4,929,259 A | | 5/1990 | Caskey et al. |
| 4,955,435 A | | 9/1990 | Shuster et al. |
| 5,013,331 A | | 5/1991 | Edwards et al. |
| 5,013,437 A | | 5/1991 | Trimmer et al. |
| 5,101,892 A | * | 4/1992 | Takeuchi ............... F28F 9/182 165/158 |
| 5,211,728 A | | 5/1993 | Trimmer |
| 5,469,915 A | | 11/1995 | Cesaroni |
| 5,499,676 A | | 3/1996 | Cesaroni |
| 5,702,601 A | * | 12/1997 | Bikson et al. .......... 210/321.79 |
| 5,837,033 A | | 11/1998 | Giglia et al. |
| 5,897,729 A | * | 4/1999 | Bikson et al. ................. 156/172 |
| 6,094,816 A | | 8/2000 | Doshi |
| 6,136,073 A | * | 10/2000 | Coan et al. ......................... 96/8 |
| 6,145,588 A | | 11/2000 | Martin et al. |
| 6,302,197 B1 | | 10/2001 | Hornby et al. |
| 6,336,987 B1 | | 1/2002 | Eriksson |
| 6,364,008 B1 | | 4/2002 | Mannoni et al. |
| 6,465,561 B1 | | 10/2002 | Yarbrough et al. |
| 6,558,450 B2 | * | 5/2003 | Sengupta et al. .................. 95/46 |
| 6,616,735 B1 | * | 9/2003 | Burban et al. ....................... 96/8 |
| 6,740,140 B2 | | 5/2004 | Giglia et al. |
| 6,742,576 B2 | | 6/2004 | Bergevin |
| 6,814,780 B2 | | 11/2004 | Bikson et al. |
| 6,832,648 B2 | | 12/2004 | Torigoe et al. |
| 7,172,696 B1 | * | 2/2007 | Martinez et al. ........ 210/321.81 |
| 7,264,725 B2 | * | 9/2007 | Vido et al. ............... 210/321.88 |
| 7,442,230 B2 | | 10/2008 | Snow, Jr. |
| 7,717,983 B2 | | 5/2010 | Semmere et al. |
| 8,747,980 B2 | * | 6/2014 | Bikson et al. ............. 428/36.91 |
| 2007/0107884 A1 | | 5/2007 | Sirkar et al. |
| 2012/0312162 A1 | * | 12/2012 | Theodore et al. ................. 95/47 |
| 2013/0071594 A1 | | 3/2013 | Bikson et al. |
| 2014/0175227 A1 | * | 6/2014 | Bikson ..................... 244/135 R |

FOREIGN PATENT DOCUMENTS

| | | |
|---|---|---|
| WO | 97/33682 | 9/1997 |
| WO | 2006/079782 A2 | 8/2006 |
| WO | 2012170933 A1 | 12/2012 |
| WO | 2013048593 A1 | 4/2013 |
| WO | 2013048594 A2 | 4/2013 |

OTHER PUBLICATIONS

"Radial" American Heritage Dictionary of the English Language, Fifth Edition. 2011 by Houghton Mifflin Harcourt Publishing Company <http://www.thefreedictionary.com/borehole>.*

International Preliminary Report on Patentability and the Written Opinion of the International Searching Authority issued on Dec. 10, 2013, from counterpart International Application No. PCT/US2012/041760, filed on Jun. 8, 2012, 8 pages.

International Search Report and Written Opinion of the International Searching Authority dated Aug. 21, 2012, from counterpart International Application No. PCT/US2012/041760, filed Jun. 8, 2012, 8 pages.

* cited by examiner

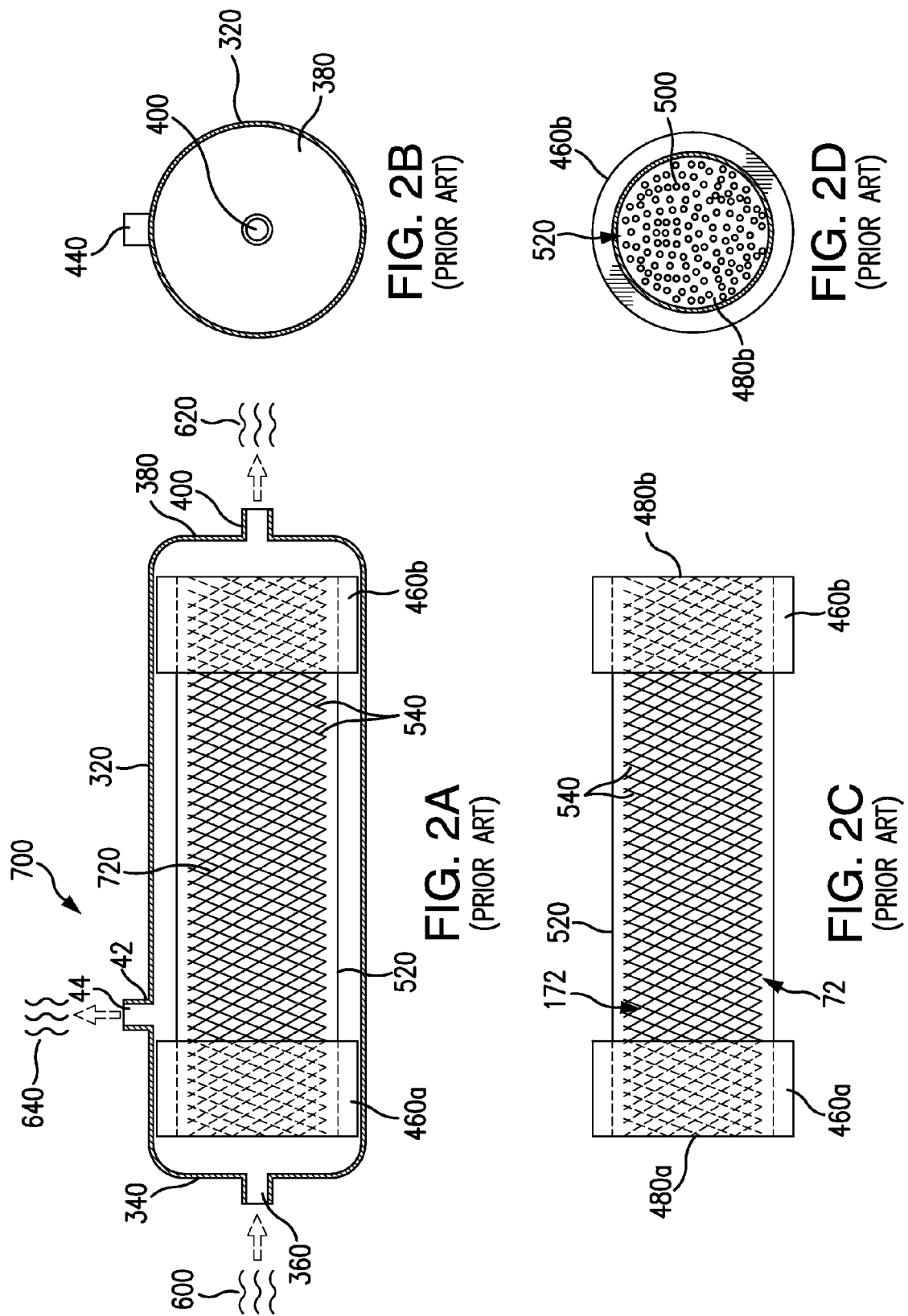

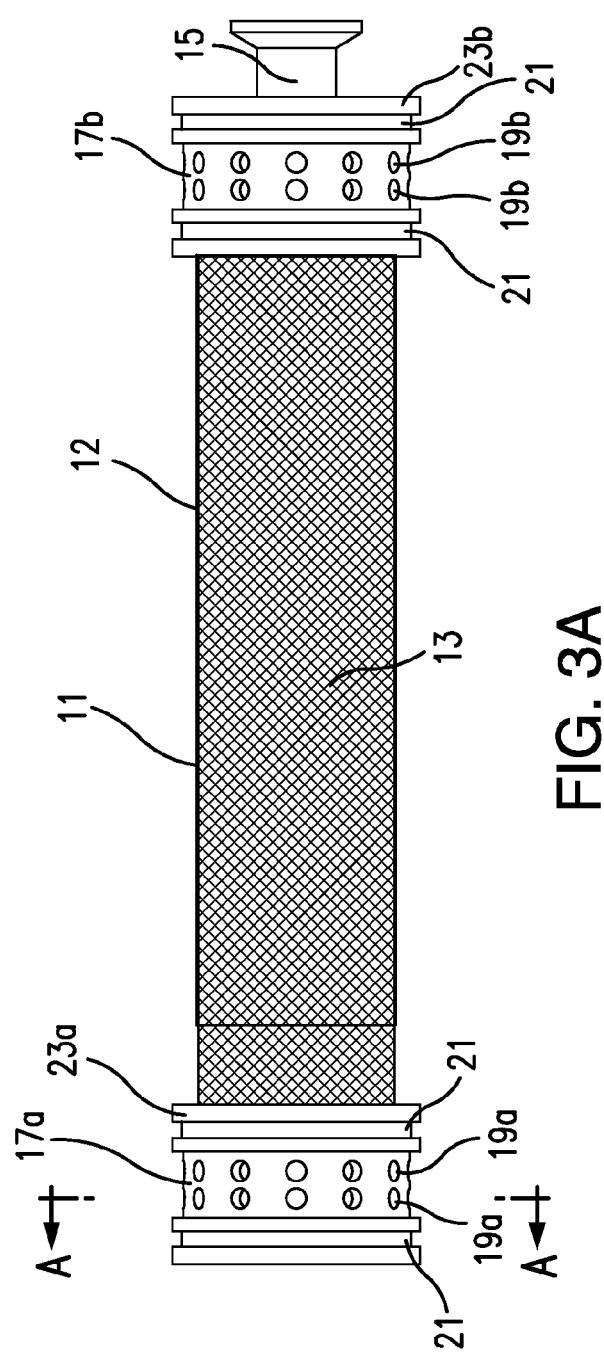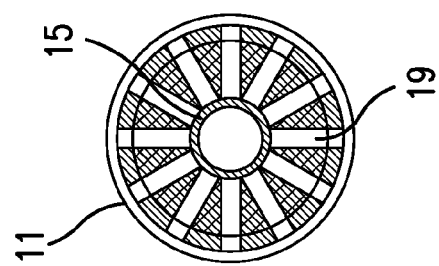

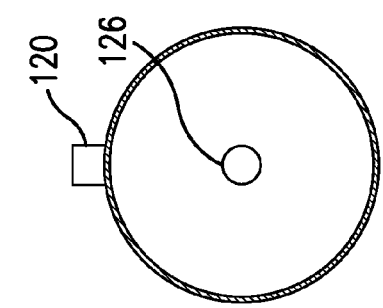
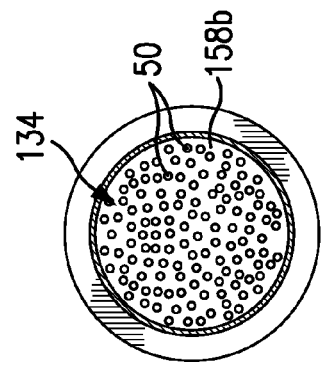
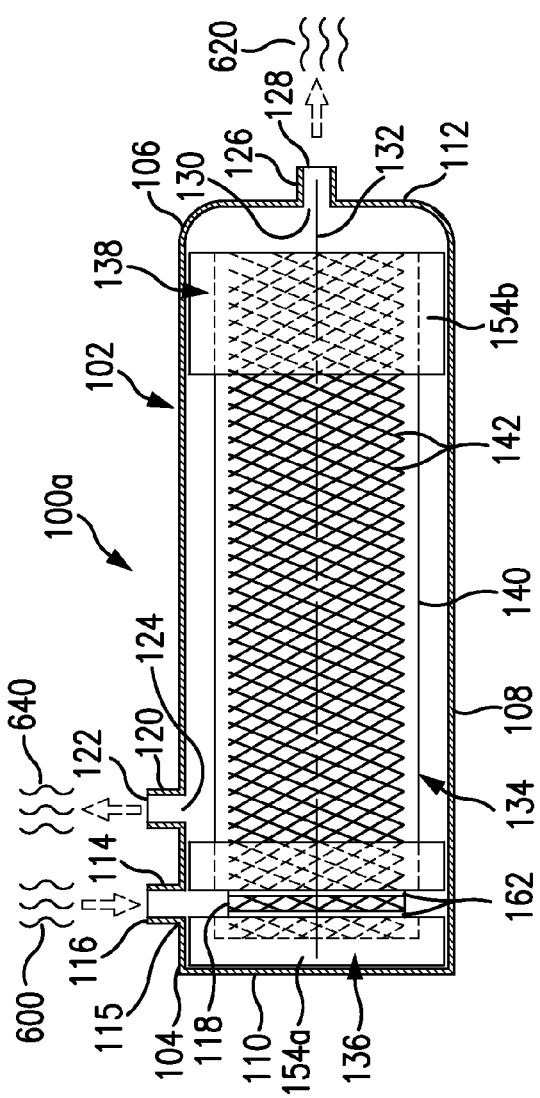
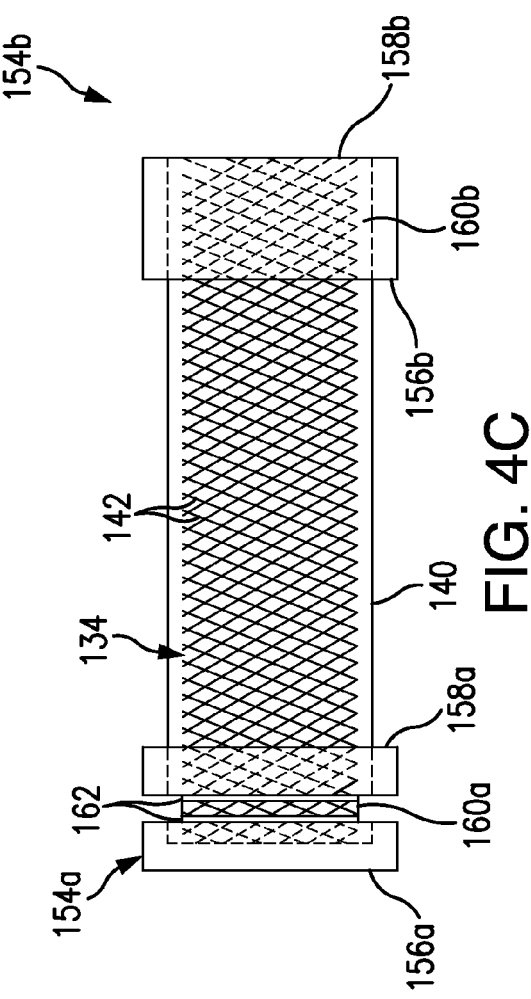

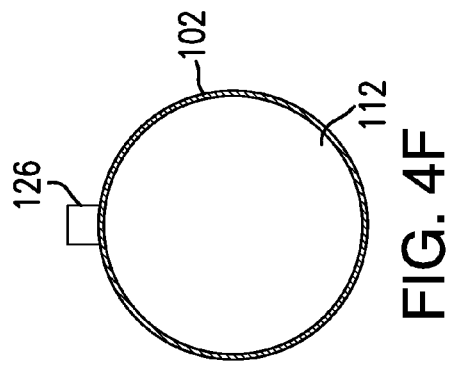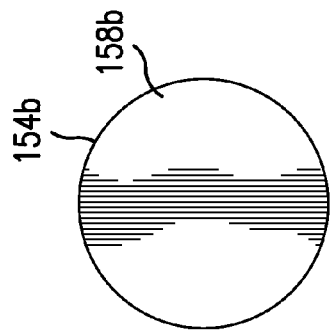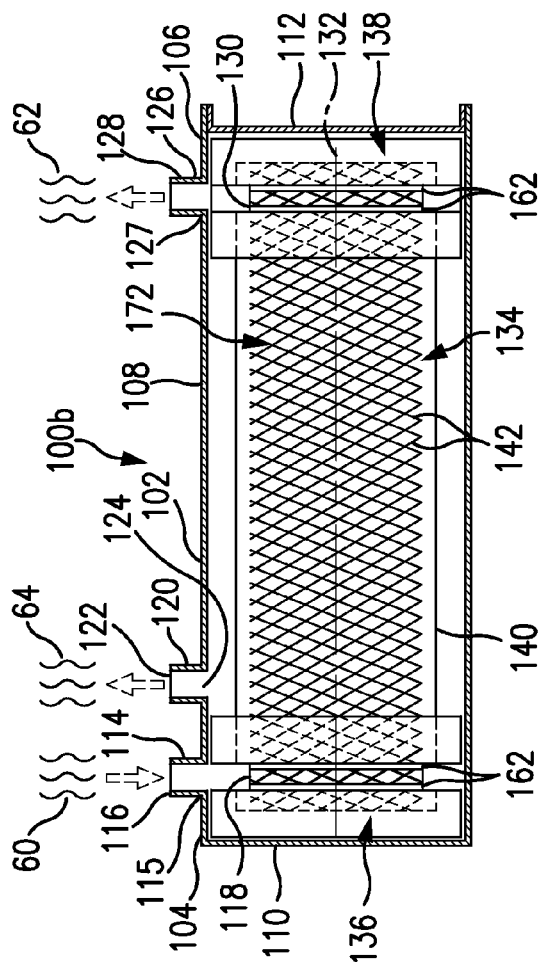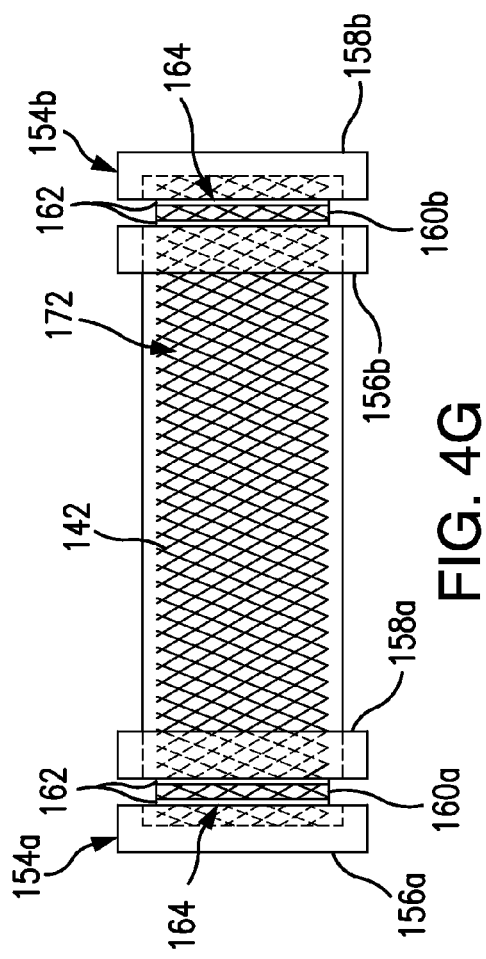

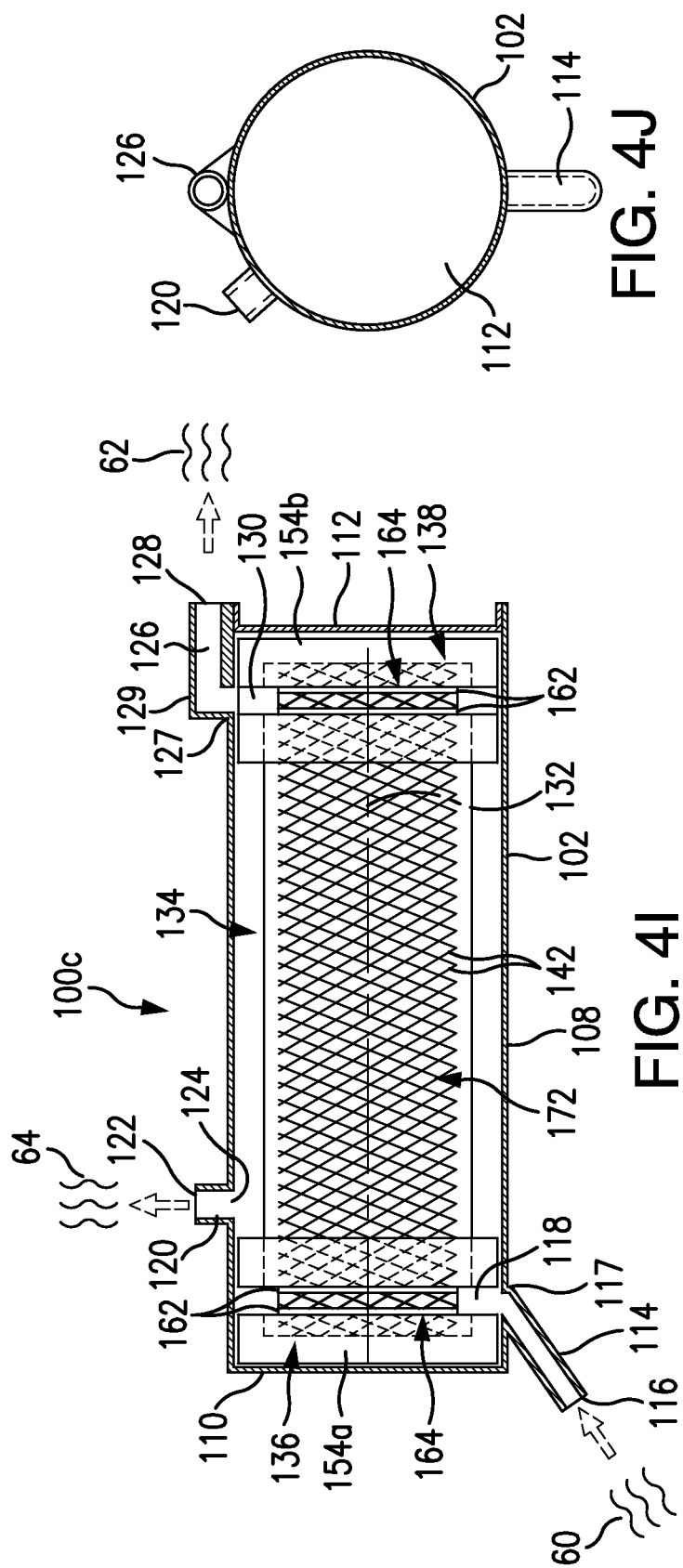

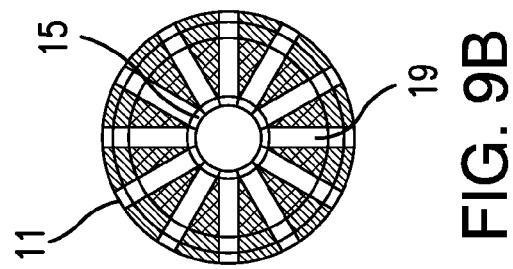
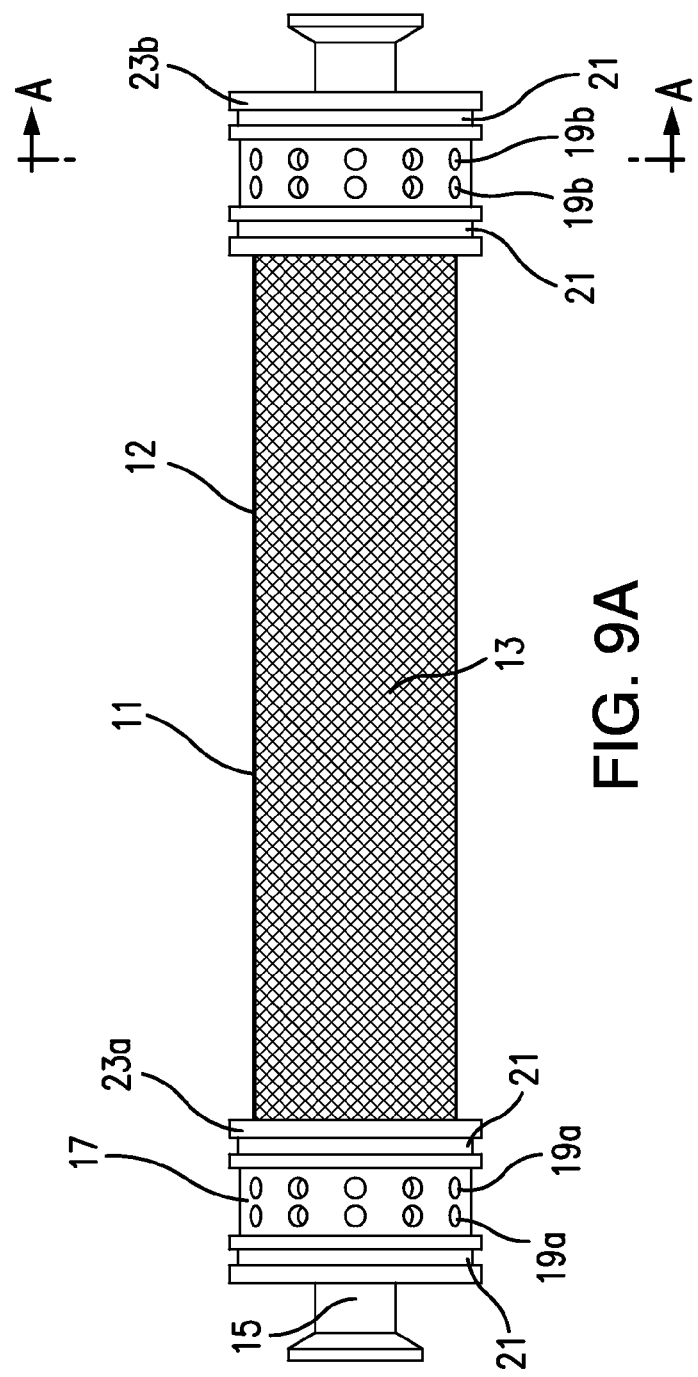
FIG. 9B
FIG. 9A

HOLLOW FIBER APPARATUS AND USE THEREOF FOR FLUIDS SEPARATIONS AND HEAT AND MASS TRANSFERS

RELATED APPLICATIONS

This application is a Continuation-in-Part of U.S. application Ser. No. 13/411,548, with the title Fluid Separation Assembly and Method, filed on Mar. 3, 2012, which claims the benefit under 35 USC 119(e) of U.S. Provisional Application No. 61/494,867, with the title Fluid Separation Assembly and Method, filed on Jun. 8, 2011, both of which are incorporated herein by reference in their entirety.

STATEMENT REGARDING FEDERALLY SPONSORED RESEARCH OR DEVELOPMENT

This invention was made with government support under Contract No. DE-SC000336 awarded by the Department of Energy (DOE). The government has certain rights in the invention.

BACKGROUND OF THE INVENTION

Hollow fiber devices are used extensively in separation of fluids both gases and liquids, in mass transfer applications such as adding or removing a gas to or from a liquid that involve transfer of the gas through a membrane and more recently in heat transfer applications.

Heat exchangers built from plastic materials can be light weight and compact while maintaining good heat transfer efficiency. In addition, polymeric heat exchange devices generally are corrosion resistant and can be less susceptible to fouling. The heat transfer efficiency of polymeric materials in heat exchangers can be enhanced by incorporation of inorganic materials with high heat transfer coefficients such as carbon or graphite particles as described in U.S. Pat. No. 6,465,561. It is also known to employ composite heat exchange devices comprised of polymeric materials and metals as disclosed in U.S. Pat. No. 6,742,576.

Heat exchange devices constructed from plastic/polymeric compositions can be divided into planar and tubular configurations. Heat exchange devices of the planar configuration are disclosed in U.S. Pat. Nos. 4,955,435; 5,499,676; 6,336,987 and 6,832,648. Heat exchange devices of the tubular configuration are disclosed in U.S. Pat. Nos. 5,469,915; 6,094,816; 6,302,197, 6,364,008 and US Patent Application Publication US2007/0107884 A1.

A planar arrangement of a device designed for an air to air heat and moisture exchanger is disclosed in U.S. Pat. No. 6,145,588. The device is constructed from composite polymeric membranes that enable the simultaneous transfer of heat and water vapors.

Hollow fibers membrane devices typically have a tubular configuration. Their design is sometimes classified as a bore side feed or a shell side feed device. Examples are disclosed in U.S. Pat. Nos. 3,422,008; 3,690,465; 3,755,034; 4,061,574; 4,080,296; 4,929,259; 5,013,437; 5,837,033; 6,740,140 and 6,814,780. Traditionally, hollow fiber devices have been used as mass transfer devices in the separation of fluid mixtures. Hollow fiber membranes are employed in fluid separation applications such as reverse osmosis, ultrafiltration, and gas separation processes as well as in gas transfer application from and into liquids. Common gas separation applications include generation of nitrogen from air, hydrogen recovery in refinery and petrochemical plants, dehydration of gases and removal of acid gases from the natural gas. The most common gas mass transfer application is removal of dissolved gases from liquids.

An integral component of most if not all existing hollow fiber devices is a tubesheet. Tubesheets are designed to provide a fluid tight seal between the shell side and the bore side of the hollow fiber device. A breach in the tubesheet integrity will compromise the operation of the device.

In existing hollow fiber device tubesheets, the fluid communication with the bore side of the hollow fibers is substantially in an axial orientation. In these arrangements, the hollow fibers are encapsulated in a suitable sealing material to form a terminal tubesheet that is severed to provide fluid access to hollow fiber bores. The direction of fluid thrust through the tubesheets and into hollow fiber bores is axial, i.e. in a direction parallel with the long axis of the hollow fiber device. Examples of conventional tubesheet designs, configured for gas separation assemblies, are shown in FIGS. 2A and 3A-3D of U.S. patent application Ser. No. 13/411,548, filed on Mar. 3, 2012, with the title Fluid Separation Assembly and Method, and U.S. Provisional Application No. 61/494,867, with the same title, filed on Jun. 8, 2011, the contents of both being incorporated herein by reference in their entirety.

Generally, tubesheets are formed from curable resinous materials such as epoxies or polyurethanes or from thermoplastic materials such as polyethylene or polypropylene. Existing tubesheets are often subject to deformation or creep under mechanical load and this limits the useful life of the device. During operation of the hollow fiber device a pressure differential may exist between the bore side of the hollow fiber device and the shell side of the device. In conventional designs, the differential pressure generates loads on the tubesheet that can lead to tubesheet rapture or tubesheet deformation due to creep. The problem is further exacerbated at high operating temperatures, since elevated temperatures often decrease the tensile strength of the tubesheet material promoting tubesheet failures. Since high temperatures and/or high differential pressures between the bore side and the shell side of the hollow fiber device are found to promote tubesheet failure in devices with conventional tubesheet designs such tubesheets often are problematic or entirely unsuitable for use in heat transfer equipment, in mass transfer devices and in fluid separation assemblies.

A number of solutions have been proposed in the art to remedy tubesheet failure under differential load. For example, Semmere et al. in U.S. Pat. No. 7,717,983 describe an air separation module with a load carrying central tube. The design provides for support of tubesheets in bore side feed air separation operation wherein differential pressure exists between the bore side and the shell side of the hollow fiber device.

SUMMARY OF THE INVENTION

However, a need still exists for improved hollow fiber devices that can operate with substantial pressure differential between the bore and the shell side without tubesheet failure. This need is particularly critical for fluid separation and heat transfer and mass transfer applications that require high temperature process conditions, e.g., in access of 70° C., where creep of tubesheet materials is accelerated, leading to a premature device failure.

A need also continues to exist for improvements in heat and mass transfer processes and hollow fiber device design fabricated from plastic/polymeric materials. Improving the structural integrity of hollow fiber devices under conditions typically faced by fluid separation devices and heat or heat and mass transfer devices operating above 70° C. also remains important.

A significant need also exists for designs using tubesheets that reduce or minimize problems discussed above, making the operation of hollow fiber devices at elevated temperatures and/or pressures possible, such as those encountered, for example, in many heat transfer or heat and mass transfer processes and high temperature gas separation applications.

In many of its aspects, the present invention relates to a hollow fiber device or cartridge that includes a hollow fiber bundle comprising a plurality of hollow fibers, for instance hollow fiber membranes. Tubesheets encapsulate the distal ends of the hollow fiber bundle. The tubesheets have a plurality of boreholes (also referred to herein as "through openings" or "through holes") in fluid communication with bores in the hollow fibers. The boreholes are formed radially in at least one tubesheet.

In specific embodiments, the boreholes are configured to maximize intersection and/or severing of the hollow fibers. For example, the radial through openings in the tubesheets intersect each or substantially each of the hollow fiber membranes to provide for fluid ingress or egress. In some implementations, the arrangement, e.g., distribution, of the radial boreholes is maximized for fluid ingress and egress. In others, the radial through holes allow for unobstructed fluid entrance/exit into hollow fiber bores.

Typically, the hollow fiber bundle is formed by helical winding of hollow fibers around a central core member or can have another suitable design.

The device can be employed in a heat transfer apparatus, a mass transfer apparatus or in a combined heat and mass transfer apparatus or as a fluid separation apparatus. It can also be used in heat transfer, a mass transfer, a combined heat and mass transfer process or in fluid separation process.

In one embodiment of the invention, the apparatus comprises: a) a cartridge including a hollow fiber bundle, including a plurality of hollow fibers, a first tubesheet and a second tubesheet encapsulating respective distal ends of the hollow fiber bundle, said tubesheets having boreholes in fluid communication with bores of the hollow fiber membranes; b) a housing surrounding the cartridge, wherein the housing has: i. a first inlet port and a first outlet port, for introducing and removing a first fluid, respectively, the first inlet port and the first outlet port being in fluid communication with boreholes in the first and second tubesheet; ii. a second inlet port and a second outlet port for introducing and removing a second fluid, respectively, the second inlet port and the second outlet port being in fluid communication with a shell side of the hollow fiber membranes; and iii. optionally, a port for removing condensed vapors, in communication with the shell side of hollow fiber membranes. The boreholes are formed radially in the at least one of said first and second tubesheet. In a specific example, at least one borehole is in communication with a fluid port in the core member.

In another embodiment, a process for heat transfer or a heat and mass transfer includes: a) directing a first gas at a first temperature to radial boreholes formed in a first tubesheet at a first end of a hollow fiber bundle that contains a plurality of hollow fibers, said boreholes being in fluid communication with bores of the hollow fibers; b) removing the first gas through radial boreholes formed in a second tubesheet at a second end of the hollow fiber bundle, the second boreholes being in fluid communication with bores of the hollow fibers; c) directing a second fluid at a second temperature at the shell side of the hollow fiber bundle; and d) removing the second fluid from the shell side of the hollow fiber bundle. The first temperature is different from the second temperature and heat or heat and mass transfer occur through walls of hollow fibers.

In case the second fluid is a gas mixture containing condensable vapor, optionally, the method further includes removing condensed vapor from the shell side of the hollow fiber bundle. The hollow fiber bundle can be surrounded by a housing having ports for the ingress and egress of the first and second fluids and, optionally, for the collection or removal of condensable vapor. In many implementations, the hollow fiber bundle is formed by helically wounding hollow fibers around a tubular core member. The tubular core member has perforations formed therein for transporting the second fluid mixture. Other suitable hollow fiber configurations can be utilized.

In some implementations, the invention relates to equipment that includes a fluid separation assembly such as an air separation device comprising a hollow fiber bundle constructed from a plurality of hollow fiber membranes, a first tubesheet and a second tubesheet encapsulating respective ends of the hollow fiber bundle, wherein one or both tubesheets have a plurality of radial through openings formed in the one or both tubesheets, and a housing surrounding the hollow fiber bundle and the first and second tubesheet, the housing having a feed inlet port, a permeate outlet port and a non-permeate (retentate) outlet port. The feed fluid and the non-permeate fluid are introduced and removed through the plurality of radial through opening formed in the first and second tubesheet respectively. The permeate fluid is removed externally to hollow fibers.

Aspects of the invention also relate to equipment, e.g., a transportation vehicle such as an aircraft that deploys at least one heat or heat and mass exchanger or a nitrogen generating air separation device. The equipment can include one or more than one device and/or apparatus such as described above.

The invention offers many advantages. In specific aspects, it addresses durability problems associated with existing tubesheets and provides a design in which the load on the tubesheets is redistributed to reduce the stress and increase the operational capabilities of the device at high differential pressures and/or at high operating temperatures. The device overcomes existing design limitations and presents enhanced durability and a longer service life.

The process and apparatus disclosed herein can be utilized in heat exchange including gas/gas, liquid/liquid and gas/liquid heat transfer processes or as a combined heat and mass transfer device such as, for example, air to air heat and moisture exchanger.

The heat or heat and mass transfer apparatus described herein is compact and light weight, having increased thermal and mechanical stability. Reducing the overall weight and size of the apparatus can be particularly important in mobile transportation applications such as automotive and aerospace uses. Heat or heat and mass transfer processes can be conducted efficiently, while minimizing the weight and the size of the device. Compared to conventional approaches, the apparatus can operate at higher differential pressures and/or higher operating temperatures while maintaining good heat or mass transfer efficiency. The approach further addresses large tolerance accumulation and thermal growth.

The reduced weight afforded by devices of this invention provide for increased fuel savings when deployed in automotive and aerospace transportation sector as compared to heat exchangers made from metals.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 2A through 2D are views of another known gas separation assembly or components thereof.

FIG. 3A is a side view of a hollow fiber cartridge having radial boreholes formed in tubesheets.

FIG. 3B is a transverse cross sectional view of a tubesheet in the cartridge of FIG. 3A.

FIGS. 4A through 4J are views of cartridges and assemblies having tubesheets provided with radial boreholes.

FIG. 9A is a side view of the hollow fiber cartridge in the apparatus shown in FIG. 9 having radial boreholes formed in tubesheets in an internal and external configuration.

FIG. 9B is a transverse cross sectional view of the tubesheet in the cartridge of FIG. 9A.

DETAILED DESCRIPTION OF THE PREFERRED EMBODIMENTS

Figures 1A, 1B:
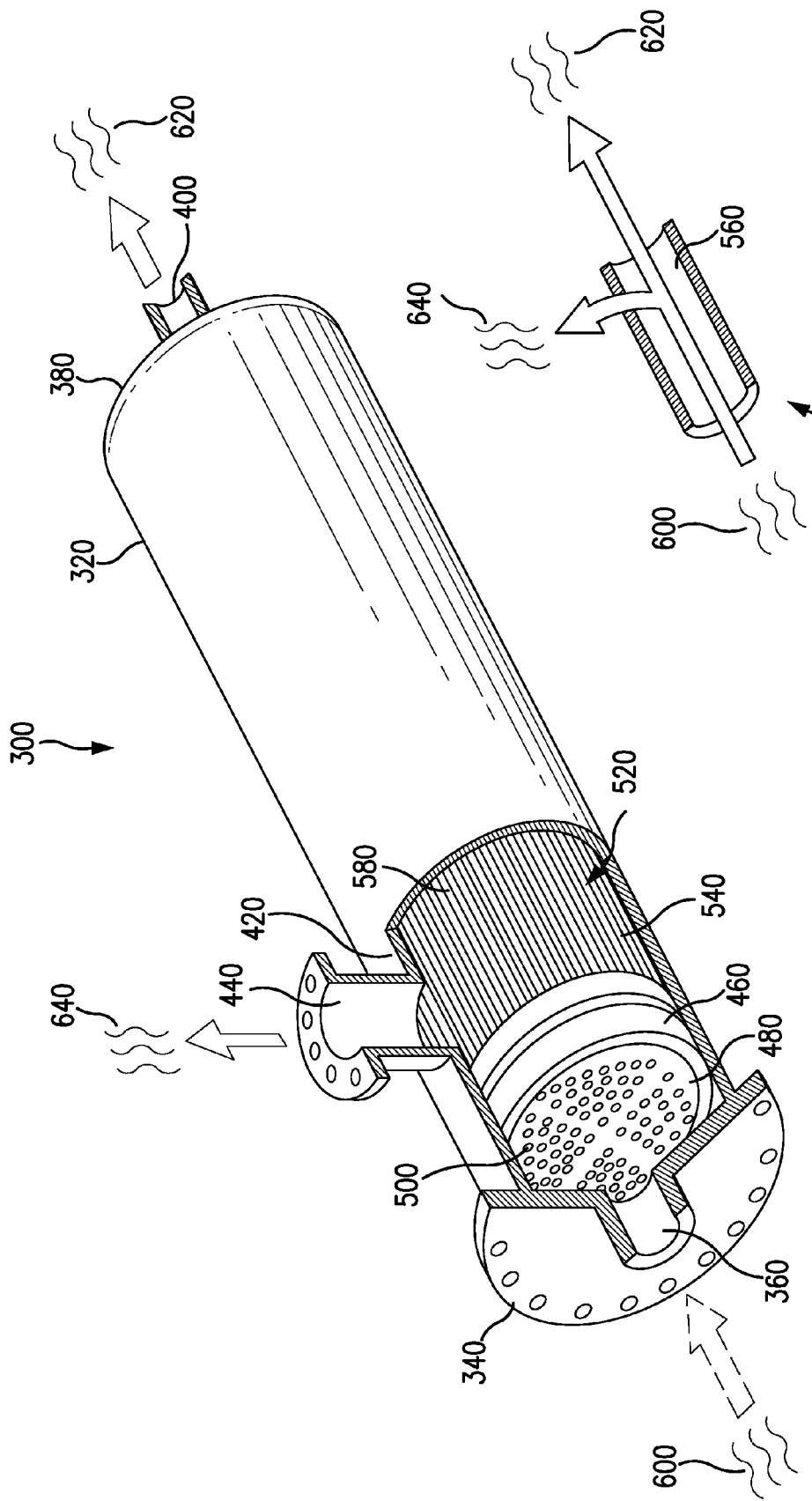
FIG. 1A is a partial cut-away perspective view of a known gas separation assembly.
FIG. 1B is a partial cut-away perspective view of gas flow through a hollow fiber membrane.
Figure 5A:
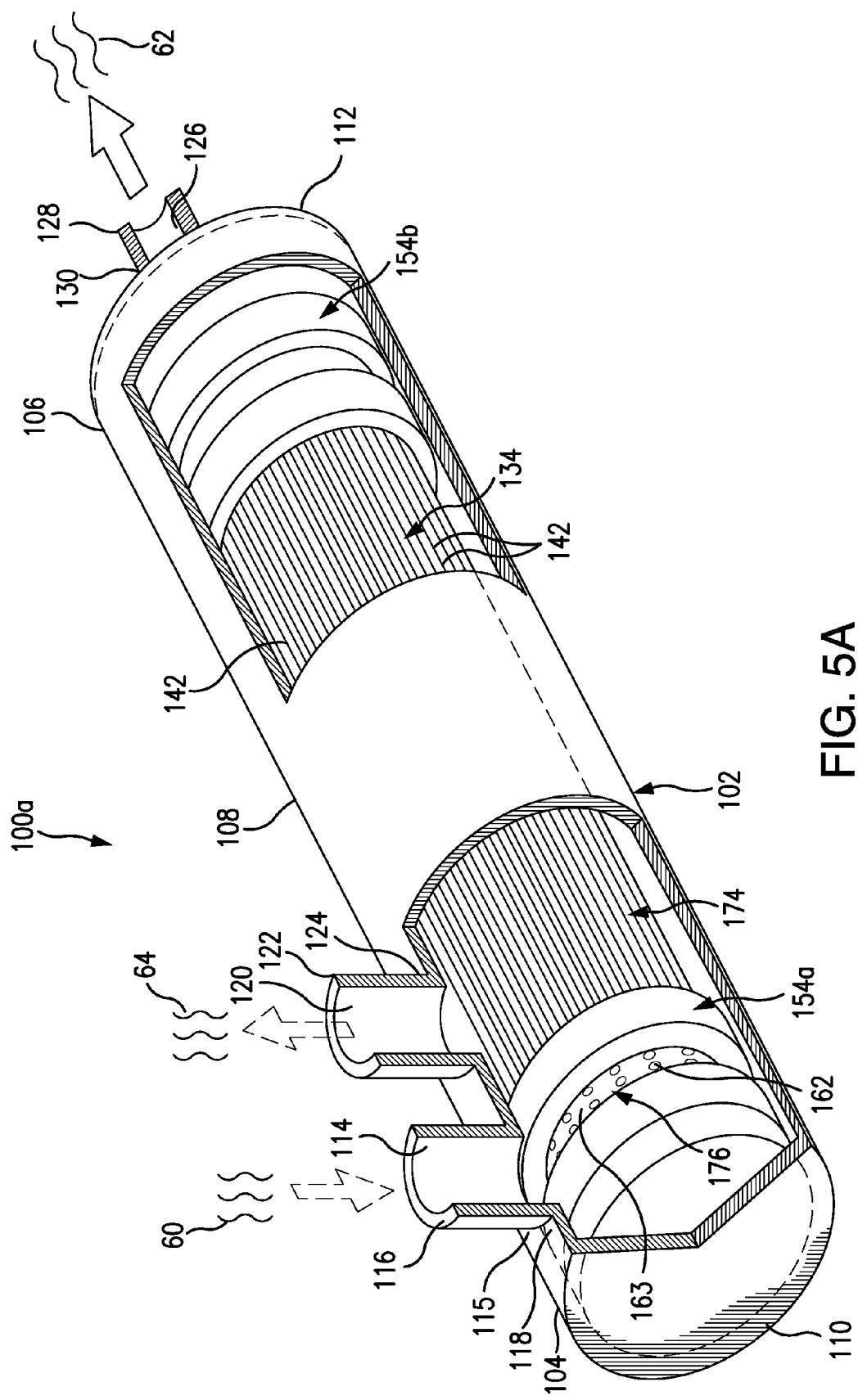
FIGS. 5A and 5B are views of yet other assemblies having radial boreholes formed in one or both tubesheets.
Figure 5B:
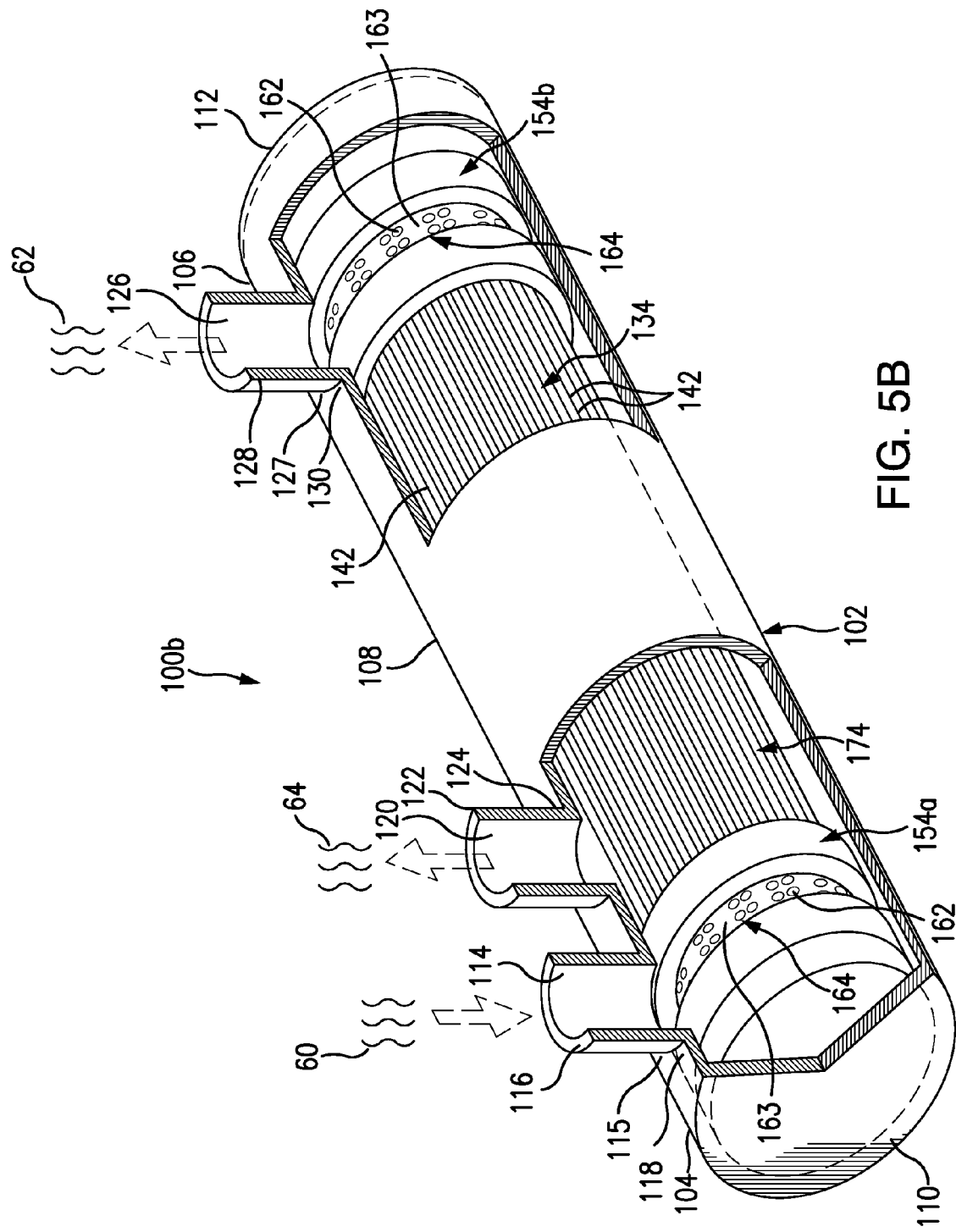

The invention generally utilizes hollow fibers, which are small diameter tubes, typically below 5 mm in diameter. These hollow fibers are configured into a hollow fiber device (also referred to herein as a cartridge), the cartridge is housed in an enclosure that can be a pressure vessel, and the combined assembly is frequently referred to as a module. The module can be used as a heat or heat and mass exchange apparatus in a heat or heat and mass transfer process or as a fluid separation device.

Hollow fiber devices can be thought of as a subset of tubular devices and provide for a high surface area in a given volume which is an advantageous, compact packaging configuration. The device can be elongated in shape, for instance cylindrical or nearly cylindrical, with hollow fibers, typically in a hollow fiber bundle, being arranged around a central core member that in some embodiments serves as a fluid introduction/withdrawal conduit.

In many cases, the core member is tubular, having, for example, a cylindrical or nearly cylindrical surface. The central core member can also be tapered, an arrangement which results in a conical device. Other suitable core member and/or device geometries can be employed. Typically, the central core member has a hollow interior and contains at least one opening to enable fluid ingress/egress to the shell side of hollow fibers. In some embodiments the core member is used to provide ingress/egress of a fluid to hollow fiber bores. It can be made from a material compatible with mechanically and thermally requirements of the process such as, for example, as a stainless steel or aluminum metal or a high temperature plastic material, for example poly (ether ether ketone), PEEK or from a composite material. In some embodiments, the central core member is used during the manufacture (assembly) of the device and then removed, resulting in a lighter cartridge that does not have a central core member.

Typically, the device employs polymeric hollow fibers. The polymeric hollow fibers can contain components (also referred to herein as additives) designed to enhance the heat transfer coefficient, or affect electrical conductivity and/or the mechanical characteristics of the hollow fibers in a desired manner. Non-limiting examples of such components include carbon (e.g., graphite) in the form of particles or fibers. Glass fibers or other fillers also can be employed, as can combinations of additives. The hollow fiber walls can be dense or porous, the latter including asymmetric and composite porous structures. The asymmetric and composite porous configurations are particularly useful for devices that also perform mass transfers or when used in a fluid separation device. Asymmetric or composite hollow fibers that separate fluids both gases and liquids are referred to as hollow fiber membranes.

The hollow fibers can be constructed from polymeric materials that may include both engineering and commodity polymers. The hollow fibers can be manufactured by melt extrusion process or from solutions by wet, dry or dry-wet spinning processes. High performance chemically inert polymers, such as perfluoropolymers, are utilized in contact with aggressive fluids. High performance engineering polymers are preferred for high temperature operations. Examples of preferred polymers include poly (ether ether ketone), including its blends with polyimides, polysulfones, polyimides, perfluoropolymers, nylons, polyesters, polycarbonates, polybenzimidolzoles and polyphenyleneoxide, including its blends. For a lower temperature operation it is convenient to utilize polyolefins, including polyethylene and polypropylene, polyvinyl type polymers, such as polyvinylidenefluoride, polyvinylfluoride and polyvinylchloride, and cellulosic polymers. The polymers may contain fillers (in particular fillers that increase heat transfer and electrical conductivity such as carbon or graphite) and processing additives. The hollow fibers can be further reinforced by composite materials such as glass or carbon fibers.

Porous hollow fibers can contain a dense non-porous region within the wall structure. In many cases, the dense region is located at one of the hollow fiber surfaces. The dense region can be formed from the same material as the wall of the porous hollow fiber, i.e. the hollow fiber is of an asymmetric structure, or the dense layer can be formed from a different material, i.e. the hollow fiber is of a composite structure. Using a relatively thin dense layer typically enhances heat and mass transfer. In many cases, the dense layer is below 2 microns, e.g., no greater than 1.5 microns or no greater than 1 micron. In specific examples, the dense layer is no greater than 0.8, 0.5, 0.3 or 0.1 microns.

The dense layer may be formed on the exterior or the interior wall surface of the porous hollow fiber by coating. In many instances the thin layer is a coating designed to impart selective mass transfer characteristics such as an improved water vapor transport or improved chemical durability in contact with aggressive fluid. Examples of coating materials that can be utilized include perfluoropolymers such as Nafion™, Hyflon AD®, Cytop® or Teflon AF®, soluble polyimides, siloxanes and soluble cellulosic polymers. Porous hollow fibers are typically used for liquid separation applications and asymmetric and composite hollow fibers with a non-porous surface separation layer are used for gas separation applications.

The hollow fiber dimensions are adjusted to provide for a low pressure drop on the bore side of the device while maximizing the device surface area packing density. The wall thickness is minimized to decrease the heat and mass transfer resistance while providing for sufficient mechanical processing characteristics and high differential pressure operational capability. In specific examples, the hollow fiber has an outer diameter typically no greater than 1 cm, e.g., between 5 mm and 100 micron, such as between 2 mm and 500 micron, or between 1 mm and 250 micron. Often, the hollow fiber wall thickness is no greater than 1 mm, for instance no greater than 500 micron and such as no greater than 50 micron.

It many embodiments, the hollow fibers are arranged around the central core member in a manner that forms a uniform structure of a desired packing density, thus reducing or minimizing fluid bypassing and channeling. The hollow fibers can be arranged to be substantially straight, producing a hollow fiber bundle having a plurality of hollow fiber membranes oriented in a direction parallel to the core member. The hollow fiber membranes also can be oriented at an angle to the core member.

In one embodiment, the hollow fiber device is fabricated by helical winding of hollow fibers around the central core member to generate a uniform and controlled packing density. A description of helical winding techniques that can be employed can be found, for example, in U.S. Pat. Nos. 3,794,468; 4,207,192; 4,336,138; 4,881,955; and 6,740,140. In each of the above cited patents the fiber wind angle was controlled by the adjusting the ratio of traverse speed (the fiber lay down) to spindle rotation speed. In some embodiments the hollow fiber device is constructed by winding hollow fibers at a low wind angle, θ. The term "wind angle" is defined as follows: with the central core member in horizontal positions, the wind angle θ is defined as the angle at which fiber is laid across the central core member with respect to the vertical axis. For example, fiber wound at 90° angle will be parallel to the main axis of the core member and straight from end to end of the cartridge. A low wind angle is the angle which is lower than 45°. By winding hollow fibers at a low wind angle, e.g., between 35° and 5°, it is possible to reduce the relative thickness of terminal tubesheets.

In specific examples, the winding process is carried out in a manner that places identical hollow fiber lengths between terminal tubesheets in each successive layer, thus preventing or minimizing uneven distribution of the fluid flow.

In other examples, the device is constructed by winding hollow fibers at a variable angle across the axial length of the device: the fibers are wound at a low wind angle in the terminal end sections of the cartridge (the tubesheet regions) and at a high wind angle in the middle section of the cartridge (the area engaged in the mass and/or heat and mass transfer, outside the tubesheet). Construction of cartridges with the variable wind angle is disclosed in U.S. Pat. No. 5,837,033. Using this approach the hollow fiber device can be fabricated to have relatively thin tubesheets while simultaneously reducing bore side fluid pressure drop. Specific examples deploy low wind angles below 45°, e.g., below 25°, for example below 15° in the tubesheet section and high wind angles above 45°, e.g., above 60° in the active area.

The hollow fiber bundle, e.g., wound as described above, is encapsulated by two tubesheets forming the ends of the device. Suitable materials that can be used to form the tubesheets include curable resinous materials such as epoxies, polyurethanes or BMI resin or from a thermoplastic material such as a polyolefin, including polyethylene or polypropylene, or from a perfluorinated resin.

A hollow fiber module with a conventional tubesheet design is shown in FIG. 1A, which is an illustration of a partial cut-away perspective view of a known gas separation assembly 300, such as an air separation module (ASM). As shown in FIG. 1A, the gas separation assembly 300 has a housing 320 with a first end 340 having a feed inlet port 360, a second end 380 having a non-permeate outlet port 400, and a permeate side section 420 having a permeate outlet port 440. The gas separation assembly 300 further has two terminal tubesheets 460 each having a face 480 with a plurality of through openings 500. The gas separation assembly 300 further has a fiber bundle 520 comprising a plurality of hollow fiber membranes 540 arranged in a parallel configuration 580 that are held or potted in the tubesheet 460, where each hollow fiber membrane 540 has a fiber membrane wall 560 (see FIG. 1B). High pressure feed gas 600, such as compressed air, enters the feed inlet port 360 and distributes across the face 480 of the tubesheet 460 into the hollow fiber membranes 540. As the feed gas 600, such as air, progresses along the length of the hollow fiber membranes 540, non-permeate gas 620 or nitrogen enriched air (NEA), exits the hollow fiber membranes 540 through the non-permeate outlet port 400, and permeate gas 640, such as oxygen enriched waste air which will contain oxygen ($O_2$), carbon dioxide ($CO_2$), and/or water ($H_2O$), permeates through the fiber membrane walls 560 and exits out the permeate outlet port 440. FIG. 1B is an illustration of a partial cut-away perspective view of the direction of gas flow, such as feed gas 600, non-permeate gas 620, and permeate gas 640, through the hollow fiber membranes 540 of the known gas separation assembly 300 of FIG. 1A.

FIG. 2A is an illustration of a side view in cross-section of another known gas separation assembly 700, such as an air separation module (ASM) in which the hollow fiber membranes 540 are arranged in a crisscross or helical configuration 720. As shown in FIG. 3A, like the gas separation module 300 of FIG. 2A, the gas separation assembly 700 has housing 320 with the first end 340 having the feed inlet port 360, the second end 380 having the non-permeate outlet port 400, and the side portion 420 having the permeate outlet port 440. The gas separation module 700 further has two tubesheets 460a, 460b. As shown in FIG. 2D, the tubesheet 460b has a face 480b with a plurality of through openings 500. The gas separation assembly 700 further has the fiber bundle 520 comprising the plurality of hollow fiber membranes 540 arranged in a crisscross configuration 720 that are held or potted on each end by the two tubesheets 460a, 460b. High pressure feed gas 600, such as air, enters the feed inlet port 360 and distributes across the face 480a of the tubesheet 460a into the hollow fiber membranes 540. As the feed gas 600, such as compressed air, is transported along the length of each hollow fiber membrane 540, non-permeate gas 620 or inert gas, such as nitrogen enriched air (NEA), exits the hollow fiber membranes 540 through the non-permeate outlet port 400, and permeate gas 640, such as oxygen enriched waste air stream which will contain oxygen ($O_2$), carbon dioxide ($CO_2$), and/or water ($H_2O$), permeates through the fiber membrane walls 540 (see further FIG. 2B) and exits out the permeate outlet port 440. FIG. 2B is an illustration of a right end view of the second end 380 of the gas separation assembly 700 of FIG. 2A. FIG. 2B shows the second end 380 of the housing 320, the non-permeate outlet port 400, and the permeate outlet port 440. FIG. 2C is an illustration of a side view of the fiber bundle 520 and the tubesheets 460a, 460b of the known gas separation assembly 700 of FIG. 2A. FIG. 2D is an illustration of a right end view of the fiber bundle 520 and face 480b of tubesheet 460b of FIG. 2C. FIG. 2D shows the face 480b of the tubesheet 460b, the fiber bundle 520, and the through openings 500 on the face 480b of the tubesheet 460b.

In contrast to conventional approaches, at least one of the tubesheets in the device described herein contains radial boreholes, also referred to herein as "radial through openings". As used herein, this term also includes near or quasi radial arrangements, where the boreholes are formed at an angle to the surface plane of the tubesheet. Typically, a plurality (two or more) of radial boreholes, are formed in the tubesheet to provide for unobstructed fluid ingress or egress into hollow fiber bores.

The boreholes formed in the tubesheet sever hollow fiber encapsulated in the tubesheet and enable ingress/egress of fluid into and out of hollow fibers. In many implementations, the hollow fiber device has open bores on both ends of the device to provide for unobstructed flow of a first fluid through the bores of the hollow fiber while a second fluid is transported through the shell side of the hollow fibers.

In specific examples, fluid communication between the boreholes and the hollow fibers is maximized. In other examples, the fluid communication between the follow fibers and boreholes is unobstructed. In yet other examples, the radial boreholes (radial through openings) intersect each or substantially each of the hollow fiber membranes. In some embodiments the boreholes intersect each hollow fiber multiple times.

In one implementation of apparatus of this invention, one fluid is introduced into hollow fiber bores through boreholes formed, e.g., radially, in the first tubesheet, and is withdrawn through bore holes formed, e.g., radially, in the second tubesheet.

Shown in FIGS. 3A and 3B is hollow fiber cartridge 11 including hollow fiber bundle 13, arranged around a hollow tubular core member 15 which can have one or more perforations or openings in the core member walls (not shown in FIGS. 3A and 3B) and can contain divides and other flow distribution elements in the center of the core member sectioning the member into separate flow regions (also not shown in FIGS. 3A and 3B).

Hollow fiber bundle 13 is comprised of hollow fibers and is elongated in shape. The ends of the bundle are encapsulated by two tubesheets 17a and 17b at the terminal ends of the device. Tubesheets 17a and 17b are provided with radial boreholes 19a and 19b.

The boreholes or through openings can be formed by milling, drilling, laser cutting or other suitable techniques. In many instances they are formed by cutting, or drilling radially into the body portion of the tubesheet from the circumference or perimeter of the tubesheet. While in many implementations the tubesheet is provided with truly radial boreholes, a near or quasi radial arrangement also can be utilized, with some or all of the boreholes being formed at an angle to the surface plane of the tubesheet. The angle will typically be less than 25, often less than 20 degrees (°). In specific examples, the angle ranges between 0 and 15°, e.g., between 5 and 15°.

The bore holes can be cylindrical, oblong, and oval or of other complex shapes. Furthermore, the cross section of the bore holes can be identical in size or vary in size including within the depth of the bore hole. In the latter case bore holes can be of a conical configuration or can have a stepped diameter cylindrical configuration. Combinations of cylindrical and conical boreholes also can be used. Boreholes can be formed with smooth or step changes in the diameter along the depth of at least some or all boreholes. In one implementation, the larger diameter holes are close to the exterior section of the tubesheet, with smaller diameter bore holes disposed closer to the interior of the tubesheet. Other arrangements can be further employed.

Structural integrity can be ensured by providing sufficient tubesheet thickness on both sides of boreholes. In some examples, the tubesheet thickness in the region closest to the active hollow fiber section is increased relative to the distal terminal tubesheet end.

In the embodiment shown in FIG. 3A, each tubesheet is provided with boreholes arranged in two rows. Arrangements using a single row or more than two rows of boreholes formed in a tubesheet also can be used. Smaller diameter boreholes can be used in conjunction with multiple row arrangements.

With multiple rows, the boreholes can form a pattern in which the boreholes are aligned from one row to another (as shown with the two rows of boreholes 19a and 19b in FIG. 3A). Staggered patterns or combinations of aligned and staggered patterns also can be used. The boreholes can be evenly (as seen in FIGS. 3A and 3B) or unevenly spaced with respect to the circumference of the tubesheets. Various boreholes arrangements are described in U.S. patent application Ser. No. 13/411,548, filed on Mar. 3, 2012, with the title Fluid Separation Assembly and Method, and U.S. Provisional Application No. 61/494,867, with the same title, filed on Jun. 8, 2011, the contents of both being incorporated herein by reference in their entirety.

The pattern and spacing of the radial through openings can be selected to minimize the pressure load and bending moments or stress on the tubesheet and maximize the strength of the tubesheet. Moreover, the pattern and depth of the radial through openings can be selected depending on the diameter of the tubesheet and/or diameter of the housing (an element that in many implementations surrounds the cartridge, as further described below).

A wound hollow fiber configuration allows for use of thinner tubesheets while intersecting all (or substantially all) hollow fibers in the device. On the other hand, in order to intersect all or substantially all hollow fibers, tubesheets of increased thickness are needed with straight fiber configurations (where the hollow fibers lie parallel to the central core member). A low wind angle can be beneficial in further reducing the required minimal tubesheet thickness.

The wind angle of the hollow fiber membranes and/or the size and location of the radial through openings can be selected to increase or maximize intersection and severing of hollow fibers, for instance, to ensure that the radial through openings intersect or sever all or substantially all of the hollow fiber membranes. In specific examples, the wind angle of the hollow fiber membranes and/or the size and location of the radial through openings can be selected so that the radial through openings intersect or sever all of the hollow fiber membranes more than once.

O-ring grooves 21 can be provided for sealing the tubesheet to a casing, as further described below. The tubesheet can have a reduced diameter section between O-ring seals (40a and 40b in FIG. 6), thus reducing the overall weight. Each reduced diameter section provides a conduit for distributing fluids from ports to bore holes and from bore holes to ports. Decreasing the cross sectional area of the conduit by increasing the diameter of the tubesheet in this section will increases the mechanical strength of the tubesheet but may also increase the fluid pressure drop. In many cases, the section is configured to optimize both considerations.

Figure 7:
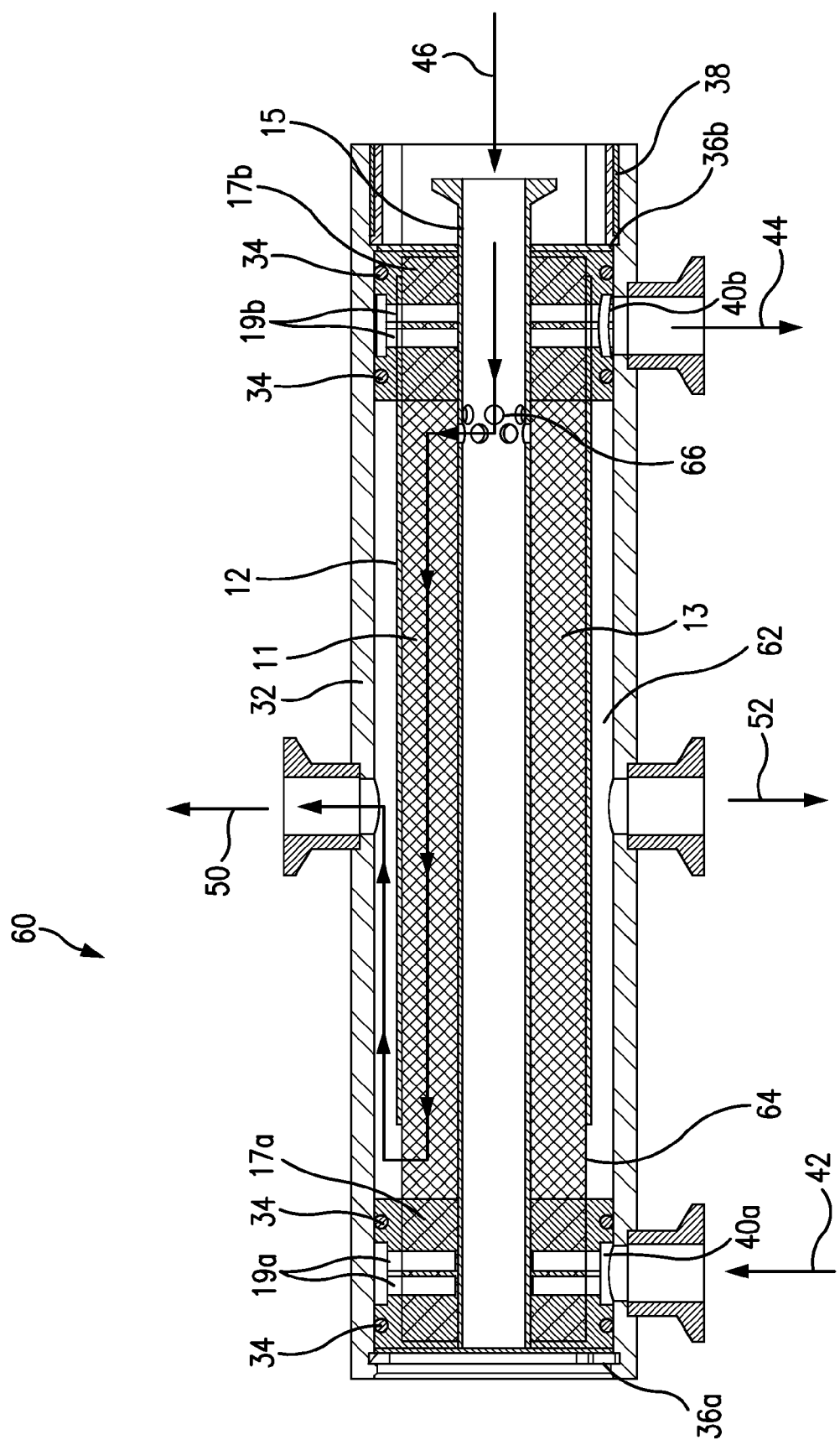
FIG. 7 is a schematic diagram of the hollow fiber apparatus according to another embodiment of the invention wherein the first fluid is introduced into hollow fiber bores through bore holes formed radially in the first tubesheet and withdrawn through bore holes formed radially in the second tubesheet; and the second fluid is introduced on the shell side of hollow fibers in an axial flow configuration wherein the shell side fluid is introduced through the interior central core member and is withdrawn trough the exterior housing port.

The hollow fiber cartridge (comprising at least one tubesheet having radial boreholes or though openings) can be configured for heat or mas transfer. The cartridge shown in FIG. 3A can be placed into a housing equipped with entrance and exit ports as shown in FIG. 7 and deployed in heat and mass transfer processes as further described in subsequent section. The hollow fiber cartridge of this design can be further use in a fluid separation apparatus or method. For example, a multicomponent fluid can be separated into a fraction (stream) enriched in one component and a fraction or stream depleted in that component. If, for instance, the multi component fluid is air, the cartridge equipped with hollow fibers capable of gas separation can be used to produce nitrogen enriched air and oxygen enriched (or nitrogen depleted) air. In one arrangement, air is introduced through the radial boreholes 19a to the bore side of the hollow fiber bundle 13. By selecting a hollow fiber membrane material having appropriate separation characteristics that enable preferential oxygen permeation through the walls of the hollow fibers the feed compressed air can be separated into a fraction (permeate) that is oxygen enriched on the shell side of the hollow fiber bundle and a fraction that is depleted in the oxygen content on the bore side of hollow fibers. The permeate fraction can contain carbon dioxide and water vapor. The retentate or non-permeate fraction or stream that exits from boreholes 19b is nitrogen enriched and can be depleted of carbon dioxide and water vapors.

The oxygen enriched air, nitrogen enriched air, or both, can be further utilized. Nitrogen enriched air, for example, can be used in a blanketing operation (e.g., to prevent fires or explosions) and the cartridge 11 can be thought of as a nitrogen generating device.

Fluid separation equipment and operations are further described with respect to FIGS. 4A through 5B. For instance, fluid separation assembly 100a, 100b and 100c include both the first tubesheet 154a and the second tubesheet 154b having radial through openings, e.g., in a specific pattern such as, for example a four opening pattern. The radial through openings 162 intersect the hollow fiber membranes 142 encapsulated by the first tubesheet 154a to form end 136, and the radial through openings 162 are open to the feed inlet port 114. Cutting or drilling the radial through openings 162 through the hollow fiber membranes 142 encapsulated by the first tubesheet 154a allows feed gas 600, preferably pressurized feed gas, access to the interiors of the hollow fiber membranes 142, and the feed gas 600 flows into the individual hollow fiber membranes 142 from the feed inlet port 114. The feed gas 600 is preferably introduced into the hollow fiber membranes 142 via the plurality of radial through openings 162 formed in the first tubesheet 154a. The second tubesheet 154b also has a plurality of radial through openings 162, e.g., in a four opening pattern. The radial through openings intersect the hollow fiber membranes 142 encapsulated by the second tubesheet 154b to form end 138, and the radial through openings 162 are open to the non-permeate outlet port 126 at the second end 138 of the hollow fiber bundle 134 that is encapsulated by the second tubesheet 154b. Cutting or drilling the radial through openings 162 through the hollow fiber membranes 142 encapsulated by the second tubesheet 154b allows non-permeate gas 620 or inert gas, such as nitrogen enriched air (NEA), to flow out of the individual hollow fiber membranes 142 and out through the non-permeate outlet port 126. The non-permeate gas 620 is preferably removed from the hollow fiber membranes 142 via the plurality of radial through openings 162 formed in the second tubesheet 154b. The radial through openings 162 intersect or sever the hollow fiber membranes 142 in the first and second tubesheets 154a, 154b, so that feed gas 600, permeate gas 640, and/or non-permeate gas 620 may be introduced into or removed from the hollow fiber membranes 142 via the plurality of radial through openings 162. The radial through openings 162 formed in each of the first and second tubesheets 154a, 154b minimize pressure loads and bending moments or stress on each of the first and second tubesheets 154a, 154b.

Thus, in one embodiment of the fluid separation assembly 100a the assembly 100a comprises a hollow fiber bundle 134 comprising a plurality of hollow fiber membranes 142, a first tubesheet 154a and a second tubesheet 154b encapsulating respective ends 136, 138 of the hollow fiber bundle 134, wherein one of the tubesheets 154a has a plurality of radial through openings 162 formed in the tubesheet 154a. The assembly 100a further comprises a housing 102 surrounding the hollow fiber bundle 134 and the first and second tubesheets 154a, 154b, the housing 102 having a feed inlet port 114, a permeate outlet port 120, and a non-permeate outlet port 126. The feed gas 600, permeate gas 640, or non-permeate gas 620 are introduced into or removed from the hollow fiber membranes 142 via the plurality of radial through openings 162 formed in the tubesheet 154a, such that the radial through openings 162 of the tubesheet 154a intersect each or substantially each of the hollow fiber membranes 142.

In another embodiment of the fluid separation assembly 100b, the assembly 100b comprises a hollow fiber bundle 134 that consists of a plurality of hollow fiber membranes 142, a first tubesheet 154a and a second tubesheet 154b encapsulating respective ends 136, 138 of the hollow fiber bundle 134, wherein at least one tubesheet 154a, and preferably both tubesheets 154a, 154b have a plurality of radial through openings 162 formed in the at least one tubesheet 154a or both tubesheets 154a, 154b. The radial through openings 162 are preferably in a repeating four opening pattern comprising four openings in a substantially square configuration. The assembly 100b further comprises a housing 102 surrounding the hollow fiber bundle 134 and the first and second tubesheets 154a, 154b, the housing 102 having a feed inlet port 114, a permeate outlet port 120, and a non-permeate outlet port 126. Feed gas 600, permeate gas 640, or non-permeate gas 620 are introduced into or removed from the hollow fiber membranes 142 via the plurality of radial through openings 162 formed in the at least one tubesheet 154a or both tubesheets 154a, 154b, such that the radial through openings 162 of the at least one tubesheet 154a or both tubesheets 154a, 154b intersect each or substantially each of the hollow fiber membranes 142. The feed inlet port 114 is in flow communication with at least a portion of the radial through openings 162 on the first tubesheet 154a, so that the feed gas 600 comprising air can flow into the intersected hollow fiber membranes 142. The non-permeate outlet port 126 is in flow communication with at least a portion of the radial through openings 162 on the second tubesheet 154b, so that the non-permeate gas 620 comprising nitrogen enriched air can flow out of the intersected hollow fiber membranes 142 and out of the housing 102. The permeate outlet port 120 is in flow communication with an interior of the housing 102, so that the permeate gas 640 comprising one or more of oxygen, carbon dioxide, and water can permeate out of the intersected hollow fiber membranes 142 and out of the housing 102. The assembly may further comprise seals that are fluid tight.

The cartridge having at least one tube sheet with radial through openings, and/or the fluid separation assembly, such as described above, can be part of an inert gas generating system in a transport vehicle, such as an aircraft. The transport vehicle may also comprise an aerospace vehicle, a space launch vehicle, a rocket, a satellite, a rotorcraft, a watercraft, a boat, a ship, a train, an automobile, a truck, a bus, or another suitable transport vehicle.

Figure 6:
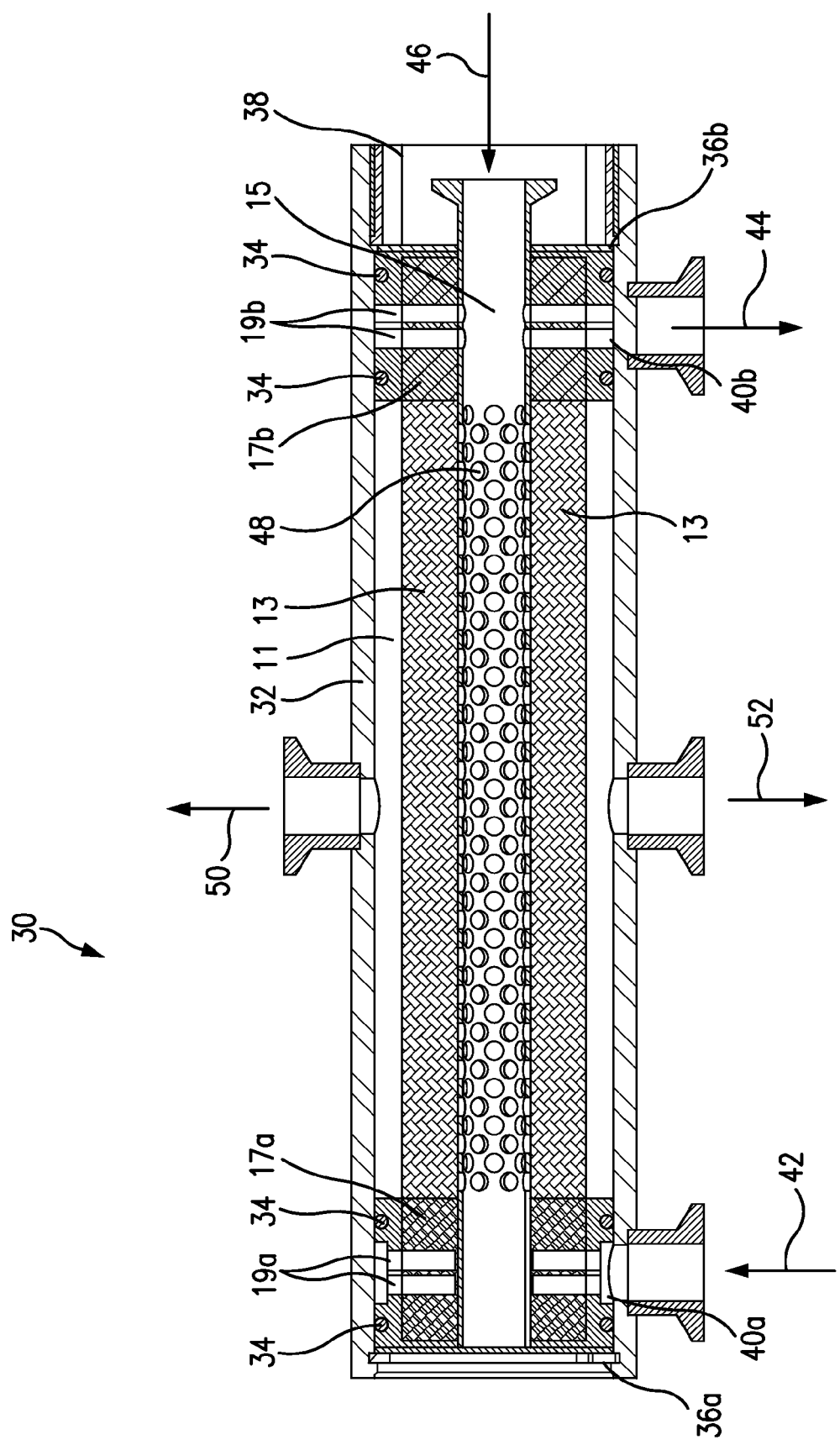
FIG. 6 is a schematic diagram of the hollow fiber apparatus according to one embodiment of this invention wherein the first fluid is introduced into hollow fiber bores through bore holes formed radially in the first tubesheet and withdrawn through bore holes formed radially in the second tubesheet; and the second fluid is introduced on the shell side of hollow fibers in a radial flow configuration.
Figure 8:
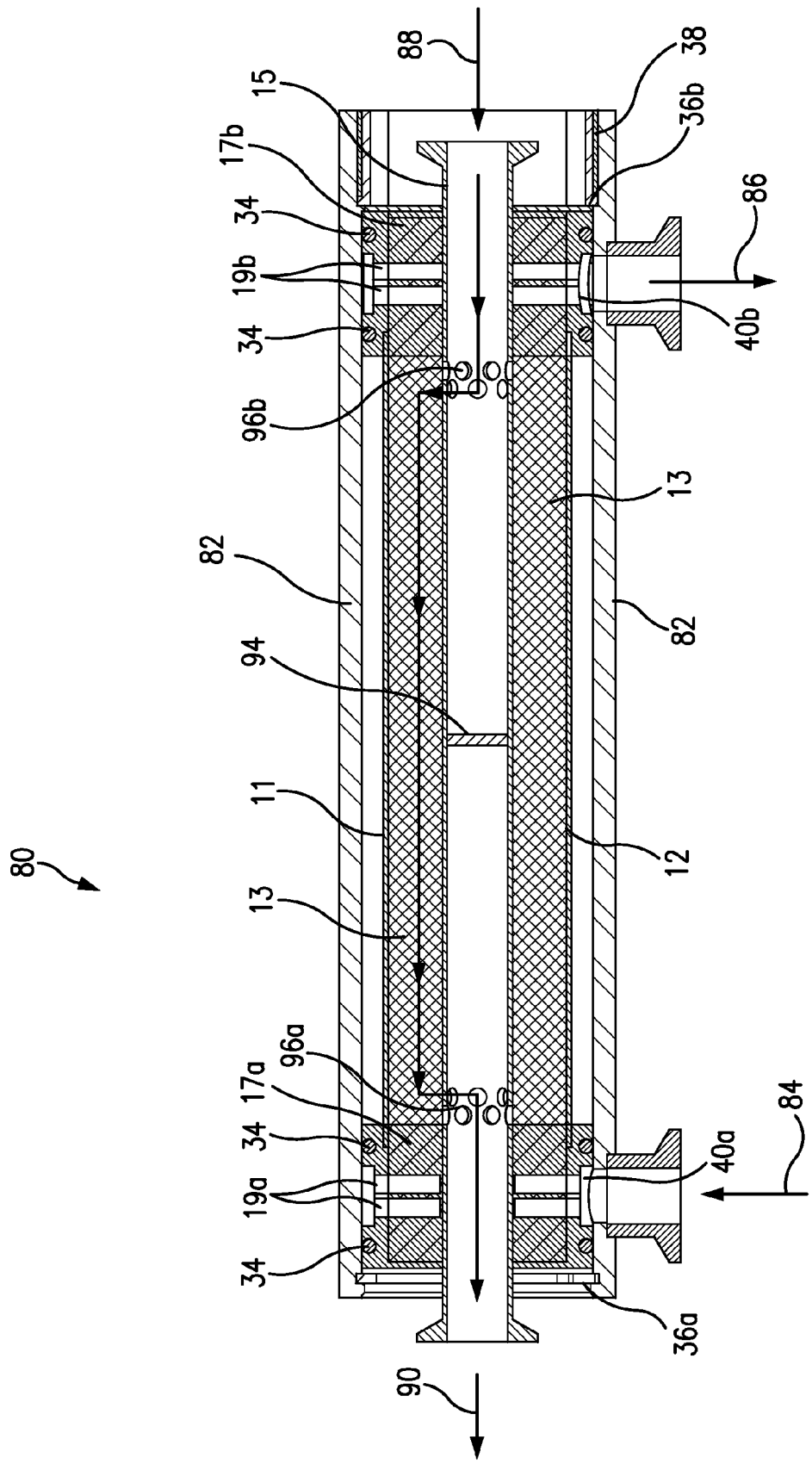
FIG. 8 is a schematic diagram of the hollow fiber apparatus according to a further embodiment of this invention wherein the first fluid is introduced into hollow fiber bores through bore holes formed radially in the first tubesheet and withdrawn through bore holes formed radially in the second tubesheet; and the second fluid is introduced on the shell side of hollow fibers in an axial flow configuration wherein the shell side fluid is introduced and withdrawn through the central core member.

In specific aspects of the invention, a cartridge comprising at least one tubesheet having radial boreholes is used in a heat or heat and mass exchange apparatus and/or process shown in FIGS. 6 through 8. For example, in FIG. 6 is shown apparatus 30 including cartridge 11 surrounded by casing (or housing) 32, which can be designed to serve as a pressure vessel. The cartridge is sealed to the external housing (casing) with O-rings 34, positioned in O-ring grooves 21 formed in each of tubesheets 17a and 17b (as seen in FIGS. 3A and 6 through 8). Alternatively, the O-ring grooves can be provided at the internal face of the casing. In other implementations, the tubesheet is directly sealed to the casing without the use of O-rings or O-ring grooves. Other suitable sealing means can be used, as can be combinations of sealing means.

The tubesheets are in contact with terminal plates 36a and 36b with one of the plates being supported by threaded end enclosure 38.

In some embodiments, the boreholes (19a and 19b FIGS. 6 through 8) formed in each tubesheet are in fluid communication with annular circumferential conduits 40a and 40b, at tubesheets 17a and 17b, respectively. The annular conduits can enhance the uniform distribution and delivery of fluid into and from hollow fiber bores, via the boreholes discussed above. Annular circumferential conduits can further provide means for fluid flow communication with fluid entrance and exit ports (for fluid introduction and removal) formed in the casing.

Generally, apparatus 30 includes at least four ports, namely: a first inlet port for introducing a first fluid at a first temperature; a first outlet port for removing the first fluid; a second inlet port for introducing the second fluid at a second temperature, typically different from the first temperature; and a second outlet port for removing the second fluid. One or more additional ports can be provided. In some embodiments an additional port is used to withdraw liquid formed during cooling of the second fluid when the second fluid is a gas that contains condensable vapors.

The apparatus can be configured to provide various flow arrangements for the heat and combined heat and mass exchange processes. Thermodynamically, the most efficient heat and mass transfer is generated by flowing the first and the second fluid counter-current to each other as deployed in the apparatus shown in FIG. 7. However, to lower the pressure drop across the device, in particular the shell side pressure drop, a cross flow configuration can be utilized. Apparatus of cross flow configuration (also called a radial flow configuration) is shown in FIG. 6. A combination of cross flow and counter-current flow can be also employed.

Several, non-limiting examples of flow arrangements that can be employed are further described below.

As shown in FIG. 6, apparatus 30 includes inlet port 42 for introducing, via boreholes 19a, a first fluid to the bore side of the hollow fibers; outlet port 44 which serves for the withdrawal of the first fluid, through boreholes 19b at the other distal end of the hollow fiber bundle. The second fluid is introduced through inlet port 46 into the hollow interior of the central core member 15, having the tubular configuration described above. Perforations 48 provide fluid communication from inlet port 46 to outlet port 50, though the shell side of the hollow fibers. The arrangement creates a radial flow as the second fluid is distributed through perforations 48, and extracted from the apparatus at outlet port 50. In some cases the direction of the second fluid flow can be reversed. Optional port 52 can be used for the extraction of condensed vapors and can be used, for example, to remove liquids formed during cooling of the second fluid when the second fluid is a gas that contains condensable vapors.

Perforations 48 can be optimized to provide for unobstructed fluid flow with a low pressure drop. The percent opening in the perforated core member can vary along the tubular core member to balance pressure drop and provide for a more uniform radial flow distribution. In some cases, the core member is entirely removed after assembly of the device, rendering the device even lighter and/or further reducing shell side pressure drop.

Other flow arrangements can be used. Shown in FIG. 7, for example, is apparatus 60, having an axial flow design. The apparatus is comprised of a hollow fiber cartridge 11, elongated in shape, surrounded by enclosure or housing 32 that can serve as a pressure vessel. The cartridge includes a hollow fiber bundle 13, comprised of hollow fibers arranged around a central core member 15 and terminal tubesheets 17a and 17b, which are in contact with terminal plates 36a and 36b with plate 36b being supported by threaded end enclosure 38.

The cartridge is sealed to the external housing with O-rings 34. Housing 32 contains ports for the introduction and withdrawal of fluids: port 42 for introducing a first fluid; port 44 for withdrawing the first fluid; port 46 for introducing a second fluid; and port 50 for removing the second fluid. The housing can be further provided with optional port 52 for withdrawal of condensed vapors; this port can be used to remove liquids formed during cooling of the second fluid when the second fluid is a gas that contains condensable vapors.

The hollow fibers are arranged around the central core member by helical winding and the tubesheets have radial boreholes 19a and 19b formed in the tubesheets to provide fluid ingress/egress into and from hollow fiber bores. The boreholes formed in each tubesheet are in communication with annular circumferential conduits 40a and 40b at tubesheets 17a and 17b, respectively. These conduits provide means for uniform distribution and delivery of the first fluid into and from hollow fiber openings Annular circumferential conduits further provide means for fluid flow communication with fluid inlet (entrance) port 42 and exit (outlet) port 44 formed in the casing that encloses the hollow fiber device; these fluid entrance and exit ports serve for introduction and removal of a first fluid. The hollow fiber bundle body is surrounded by a fluid impervious barrier 12 except for a narrow gap 64 close to tubesheet 17a. Gap 64 allows for unobstructed egress of the second fluid. The central core member has perforations 66 formed close to the tubesheet 17b to provide fluid communication from the port 46 to the port 50 through the shell side of hollow fibers. The flow path of the second fluid on the shell side of hollow fibers is axial as shown by arrows and substantially counter-current to the flow of the first fluid through the bores of hollow fibers. In some embodiments the second fluid flow direction can be reversed to form a substantially co-current flow configuration.

An apparatus (device) for the heat and mass transfer according to another embodiment of present invention is shown as apparatus 80 in FIG. 8. This apparatus is of an axial flow design and generally comprises hollow fiber cartridge 11 surrounded by enclosure or housing 82 that can serve as a pressure vessel. The cartridge includes a hollow fiber bundle 13 arranged around a central core member 15 and terminal tubesheets 17a and 17b having, respectively, radial holes 19a and 19b. The radial boreholes provide fluid access to and from hollow fiber bores and are in communication with annular circumferential conduits 40a and 40b formed, respectively, in the two tubesheets. Tubesheets 17a and 17b are in contact with terminal plates 36a and 36b with one of the plates (36b) being supported by threaded end enclosure 38.

The hollow fiber bundle can be optionally surrounded by a fluid impervious barrier 12. The cartridge is sealed to the external housing with O-rings 34. The housing contains ports for introduction and withdrawal of fluids: port 84 for introduction of the first fluid, port 86 for withdrawal of the first fluid; port 88 for introduction of the second fluid and port 90 for withdrawal of the second fluid. The hollow fibers are arranged around the central core member by the helical winding to form a bundle. The annular conduits provide means for uniform distribution and delivery of the first fluid into and from hollow fiber bores. Annular circumferential conduits further provide means for fluid flow communication with fluid entrance port 84 and exit port 86 formed in the casing that encloses the hollow fiber device; these fluid entrance and exit ports serve for introduction and removal of the first fluid.

The central core member contains a substantially fluid tight partition 94 positioned therein. The central core member further has perforations 96a formed close to the tubesheet 17a and perforations 96b formed close to the tubesheet 17b to provide for fluid flow from port 88 to the port 90 through the shell side of hollow fibers. The flow path of the second fluid on the shell side of hollow fibers is axial as shown by arrows and substantially counter-current to the flow of the first fluid through bores of hollow fibers. In some embodiments the second fluid flow direction can be reversed to form a substantially co-current flow configuration.

Figure 9:
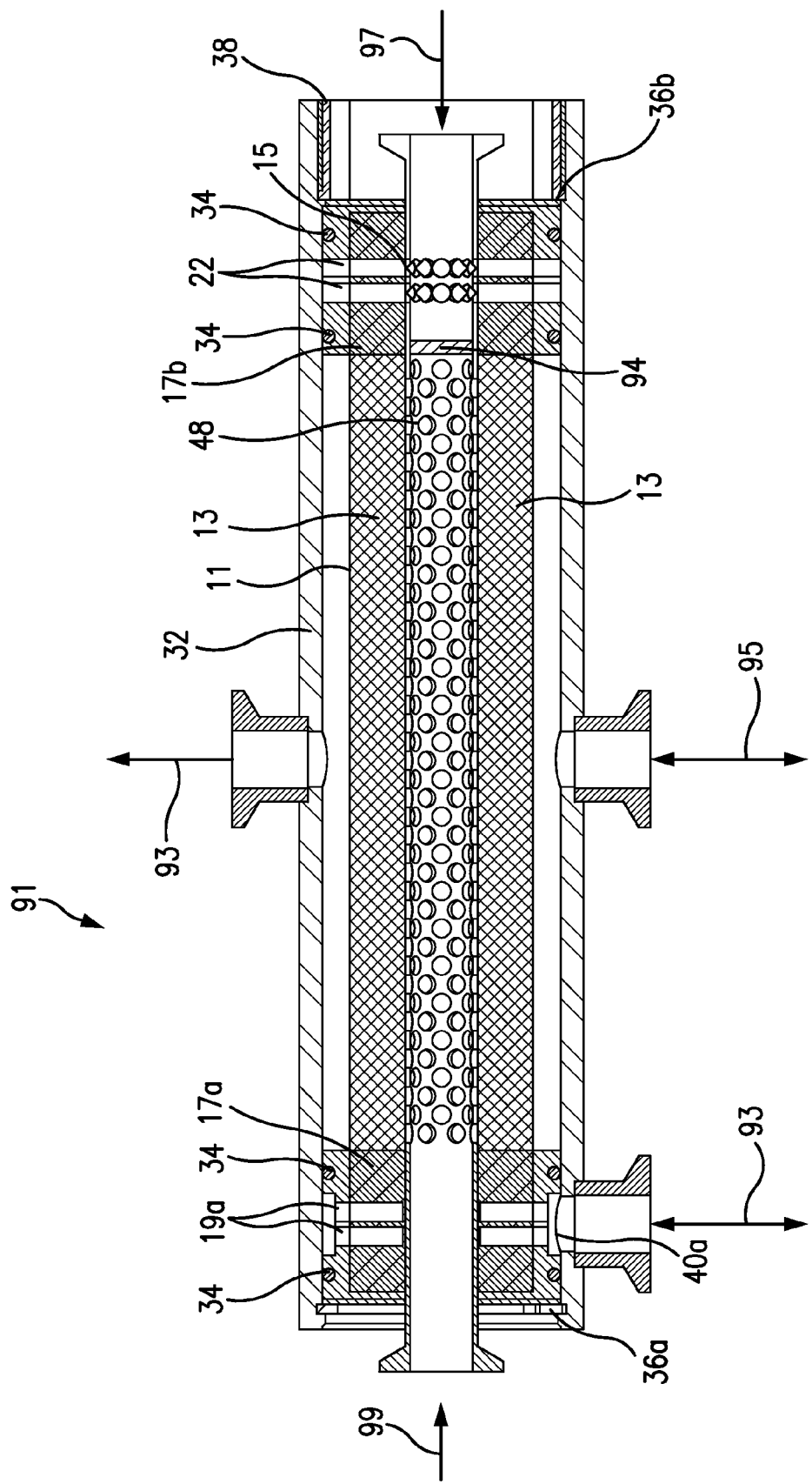
FIG. 9 is a schematic diagram of the hollow fiber apparatus according to a further embodiment of this invention wherein the first fluid is introduced into hollow fiber bores thorough a tubular core conduit connected internally to radial boreholes formed in the tubesheet and withdrawn through bore holes formed radially in the second tubesheet external to the tubesheet; and the second fluid is introduced on the shell side of hollow fibers in an radial flow configuration wherein the shell side fluid is introduced through the central core member, transported across hollow fiber bundle and withdrawn through external port.

An apparatus (device) for the heat and mass transfer according to another embodiment of present invention is shown as apparatus 91 in FIG. 9. FIG. 9 is a schematic diagram of the hollow fiber apparatus according to a further embodiment of this invention wherein the first fluid is introduced into hollow fiber bores thorough a tubular core conduit connected internally to radial boreholes formed in the tubesheet and withdrawn through bore holes formed radially in the second tubesheet, external to the tubesheet. The second fluid is introduced on the shell side of hollow fibers in an radial flow configuration wherein the shell side fluid is introduced through the central core member, transported across hollow fiber bundle and withdrawn through external port. In FIG. 9 apparatus 91 includes cartridge 11 surrounded by casing (or housing) 32, which can be designed to serve as a pressure vessel. The cartridge is sealed to the external housing (casing) with O-rings 34, positioned in O-ring grooves 21 formed in each of tubesheets 17a and 17b (as seen in FIGS. 3A and 6 through 8). The tubesheets are in contact with terminal plates 36a and 36b with one of the plates being supported by threaded end enclosure 38. The hollow fiber body 13 of the cartridge is formed by helically winding hollow fibers around the central core member 15.

Apparatus 91 includes four ports, namely: a first inlet port 97 for introducing a first fluid at a first temperature; a first outlet port 93 for removing the first fluid; a second inlet port 99 for introducing the second fluid at a second temperature, typically different from the first temperature; and a second outlet port 93 for removing the second fluid. One or more additional ports can be provided. In some embodiments an additional port 95 is used to withdraw liquid formed during cooling of the second fluid when the second fluid is a gas that contains condensable vapors. The first fluid is introduced into hollow fiber bores thorough a tubular core conduit 15 connected internally to radial boreholes 22 formed in the tubesheet 17b, the first fluid is transported through hollow fiber bores and withdrawn through bore holes 19a formed radially in the second tubesheet 17a external to the tubesheet. The second fluid is introduced through port 99 into tubular core member having perforations 48 formed in its wall, the fluid is transported across shell side of hollow fibers 13 and removed through the exit port 93. A fluid impervious partition 94 is placed inside the core member close to the front face of the tubesheet 17b to prevent direct communication between first and second fluids. The second fluid flow configuration is substantially radial across the hollow fiber bundle.

FIG. 9A is a side view of the hollow fiber cartridge 11 in the apparatus 91 shown in FIG. 9 having radial boreholes formed in tubesheets in an internal and external configuration, respectively.

FIG. 9B is a transverse cross sectional view of the tubesheet 17b in the cartridge 11 of FIG. 9A. The radial bore holes 22 are in an internal communication with core member 15.

Figure 10:
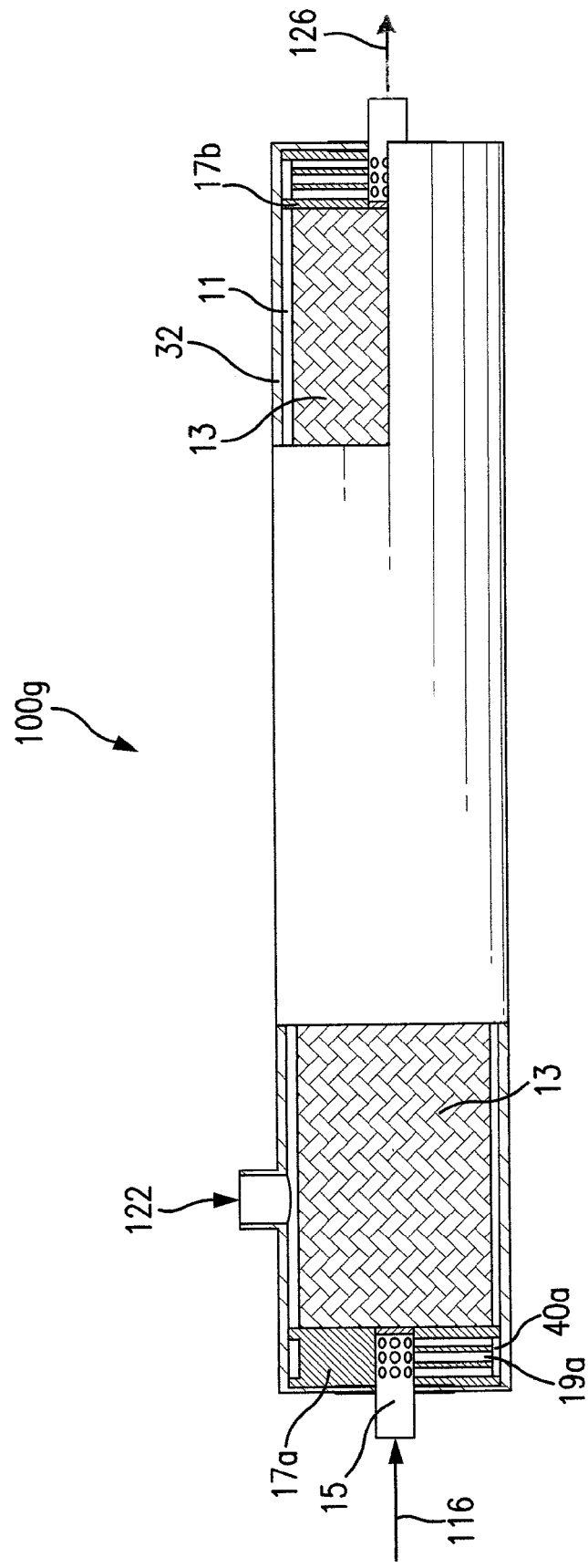
FIG. 10 is a gas separation assembly of hollow fiber membranes according to a further embodiment of this invention wherein the feed gas stream is introduced into hollow fiber bores thorough a tubular core conduit connected internally to radial boreholes formed in the tubesheet and the non-permeate gas stream is withdrawn through bore holes formed radially in the second tubesheet connected internally to a tubular core member; and the permeate gas stream collected external to hollow fibers on the shell side.

In some embodiments boreholes in both tubesheets can be in internal communications with core member as shown in FIG. 10, illustrating a gas separation assembly where the feed gas stream is introduced into hollow fiber bores thorough a tubular core conduit connected internally to radial boreholes formed in the tubesheet and the non-permeate gas stream is withdrawn through bore holes formed radially in the second tubesheet connected internally to a tubular core member; the permeate gas stream is collected external to hollow fibers on the shell side.

During operation, the heat or heat and mass transfer between two fluids takes place through the walls of hollow fiber. The two fluids can be both gases or can be both liquids. In other implementations, one of the fluids is a gas, while the other is a liquid. As used herein, terms such as "a liquid" or "a gas" encompass single component systems (such as water) as well as mixtures that include two or more components, e.g., air.

During the heat exchange process, a fluid at a certain temperature is directed to the apparatus and is removed at a different (warmer or colder) temperature. For instance, hot air at a temperature within the range of from about 50° C. to about 200° C., for example within the range of from about 80° C. to about 130° C. can be cooled to a temperature within the range of from about 0° C. to about 50° C., e.g., from about 10° C. to about 30° C., while raising the temperature of the cooling fluid. A cooling gas such as air can be introduced at a temperature within the range of from about −20° C. to about 40° C., for example within the range of from about 0° C. to about 30° C. A cooling liquid such as water or refrigerated hydraulic fluid can have an initial temperature within the range of from about −10° C. to about +30° C., for example within the range of from about 0° C. to about 10° C., and can exit the apparatus at a temperature within the range of from about 0° C. to about 70° C., e.g., from about 10° C. to about 50° C. degrees centigrade.

The first fluid can be introduced into the device at pressures between 3 barg and 70 barg, frequently between 4 barg and 50 barg. The second fluid is introduced at a pressure substantially lower than that of the first fluid, the differential pressure between the two fluids can be from about 3 barg to about 60 barg.

The processes described herein can combine mass transfer with heat exchange. For example, a temperature change of the permeating gas will occur during gas permeation through hollow fiber membrane wall due to the Jules-Thompson effect (or JT effect). In such cases, the heat transfer will occur during the gas separation simultaneously with the mass transfer, i.e. the heat transfer will occur between the permeate and the non-permeate (retentate) fluid streams. Thus the hollow fiber membrane device or perimeter can function as a combined mass and heat transfer device.

In specific implementations, a process is conducted in an apparatus such as described above and constructed from polymeric hollow fiber membranes that enable simultaneous transfer of heat and water vapor in air to air heat exchange. In one example, the heat and water vapor are transferred simultaneously from hot moisture laden air flown on one side of hollow fibers into a colder and dryer air flown on the other side of hollow fibers. In another example, hot gas laden with moisture (water vapor) is flown on one side of the hollow fibers and cold water is flown on the opposite side of the hollow fibers. The gas is cooled and the water vapor is simultaneously removed by permeation through walls of hollow fibers into cooling water. Yet other embodiments of the invention address heat exchange processes between air and a refrigerated hydraulic fluid such as, for instance, ethylene glycol or propylene glycol. In the latter case hot air is cooled by the refrigerated hydraulic fluid. The cooling fluid is introduced into the bore side of the hollow fiber device at an elevated high pressure, while the air is introduced on the shell side at a low, substantially atmospheric pressure. The moisture laden air is cooled by the hydraulic fluid by transferring excess heat through hollow fiber walls. The water vapor condensed on the shell side during the heat transfer is removed together with the cooled air (as droplets and mist) through the product port or is separated from the cooled air and is removed through a separate liquid drainage port.

The device, apparatus and process described herein can be used in various industrial or commercial settings and operations. The compact and light weight properties are particularly advantageous in transportation applications, e.g., military, commercial and general aviation aircraft, including split wing piston and jet aircraft, helicopters, as well as in space exploration, marine, train or road transportation systems. In specific examples, the apparatus is used in passenger aircraft, cargo aircraft, military aircraft, rotorcraft and other types of aircraft or aerial or space vessels or vehicles, in tanker ships, fuel supply ships, boats, other watercraft, trains, automobiles, trucks, busses and other types of vehicles. The apparatus also can be used in industrial applications such as treatment of electronic and pharmaceutical fluid streams that preclude contact with metal components, and many others.

In aircrafts, for instance, a heat or heat and mass exchanger according to the invention can be used for gas-gas, gas-liquid or liquid-liquid heat transfers. Non-limiting examples include cooling or warming cabin air, extracting heat from the engine oil system to heat cold fuel, gasification of liquid refrigerant and liquefaction of gaseous refrigerant during heat absorption and heat generation in the refrigerating system.

Rejection of thermal energy generated from electrification or other unwanted heat sources, for instance, can be to the large quantity of fuel available that must be carried on the aircraft. Heating fuel prior to it entering the engine combustor can be advantageous to the engine efficiency, typically within limits imposed by the thermal stability of the fuel jet employed. Bearing in mind that fuel flow is uneven, with relatively low flow during ground idle or idle-descent and extremely high flow during take-off, the fuel can be circulated back into the fuel tank after being used for cooling, rendering the fuel tank a thermal energy storage means, as is often found on military platforms.

Another heat sink for electrical components, electronics and other sources of unwanted heat that can be used is the ambient air, abundantly present around the aircraft.

Other specific examples of heat transfer or heat and mass transfer processes that can be conducted according to embodiments of the invention include but are not limited to recovery of latent heat from a low heat grade water vapor containing streams, for example such as a flue gas, and cooling or heating of fluids in electronics and pharmaceutical industries which cannot be carried out in metal based devices.

The heat or heat and mass exchange apparatus and process described herein can be used in conjunction with other components and/or operations.

In specific embodiments, the heat or heat and mass exchange apparatus and/or process can be used in a setting that also employs a fluid separation assembly and/or method.

As described above (see, e.g., FIGS. 4A through 5B), the fluid separation assembly can include a hollow fiber bundle comprising a plurality of hollow fiber membranes, a first tubesheet and a second tubesheet encapsulating respective ends of the hollow fiber bundle, wherein one or both tubesheets have a plurality of radial through openings formed in the one or both tubesheets, and a housing surrounding the hollow fiber bundle and the first and second tubesheet, the housing having a feed inlet port, a permeate outlet port and a non-permeate (retentate) outlet port. Feed fluid and non-permeate fluid are introduced or removed through the plurality of radial through opening formed in the first and second tubesheet respectively such that the radial through openings in the tubesheets intersect each or substantially each of the hollow fiber membranes. The apparatus is useful for fluid separation applications wherein the feed fluid comprised of at least two components is introduced at an elevated pressure into hollow fiber bores and a fluid enriched in one of the feed fluid components is removed as a permeate through hollow fiber walls and a second non-permeate stream depleted in said feed fluid component is removed as a non-permeate stream. In one example, the device is used as an ultrafiltration apparatus to purify a liquid feed stream containing at least two components of different molecular weights wherein a liquid stream enriched in a low molecular weight component (s) is removed as a permeate through hollow fiber walls and a second stream enriched in a high molecular weight component (s) is removed as a non-permeate stream. In another example, the device is a gas separation apparatus that is used to separate a feed compressed air stream into nitrogen enriched non-permeate stream and oxygen enriched permeate stream.

Another embodiment of gas separation apparatus is shown in FIG. 10. The apparatus 100g is of an axial flow design. The apparatus is comprised of a hollow fiber cartridge 11, elongated in shape, surrounded by enclosure or housing 32 that serve as a pressure vessel. The cartridge includes a hollow fiber bundle 13, comprised of hollow fiber membranes arranged around a central core member 15 (the hollow fiber membranes are arranged around the core member by helical winding) and terminal tubesheets 17a and 17b. The housing 32 is equipped with the feed gas entrance port 116, non-permeate gas exit port 126 and permeate gas exit port 122. The feed gas is introduced through perforations in the tubular core member 15 into bore holes formed in tubesheet 17a that intersect substantially all hollow fiber membranes. The gas is transported along hollow fiber bores wherein the gas is depleted of highly permeable components by permeation through hollow fiber walls. The non-permeate gas stream is removed through bore holes formed in tubesheet 17b which are in communication with internal core member and then exit through port 126. The internal core member has impervious internal partition that prevents the feed flow gas from flowing directly from the port 116 to the port 126 and bypassing the hollow fiber bundle (not shown). The permeate gas is collected on the shell side of the hollow fiber membranes and is removed through port 122.

The heat or heat and mass exchange apparatus and process described herein can be used as a fluid separation apparatus in conjunction with a method for supplying nitrogen enriched air from a fluid separation assembly to at least one fuel tank of a transport vehicle, the method comprising: providing a fluid separation assembly such as the fluid separation assembly described above, introducing compressed air through the feed inlet port and radially through openings in the first tubesheet into hollow fiber membranes, removing oxygen enriched air and water vapor by preferential permeation through hollow fiber membranes along the fiber bundle as a permeate gas stream and directing the permeate stream through the permeate outlet port; removing non-permeate nitrogen enriched air through radial holes in the second tubesheet and subsequently through the non-permeate outlet port; and supplying the non-permeate nitrogen enriched air to at least one fuel tank. The permeate oxygen enriched stream is withdrawn in a substantially counter current flow configuration to the overall direction of the feed gas flowing through hollow fiber bores. The separation efficiency of the air separation process can be further enhanced by introducing a low pressure air sweep stream on the permeate side of the hollow fiber bundle in a section limited to the feed side tubesheet only while the permeate stream is removed substantially counter currently to the overall direction of the flow of feed gas through the bores of the hollow fibers.

Figure 11:
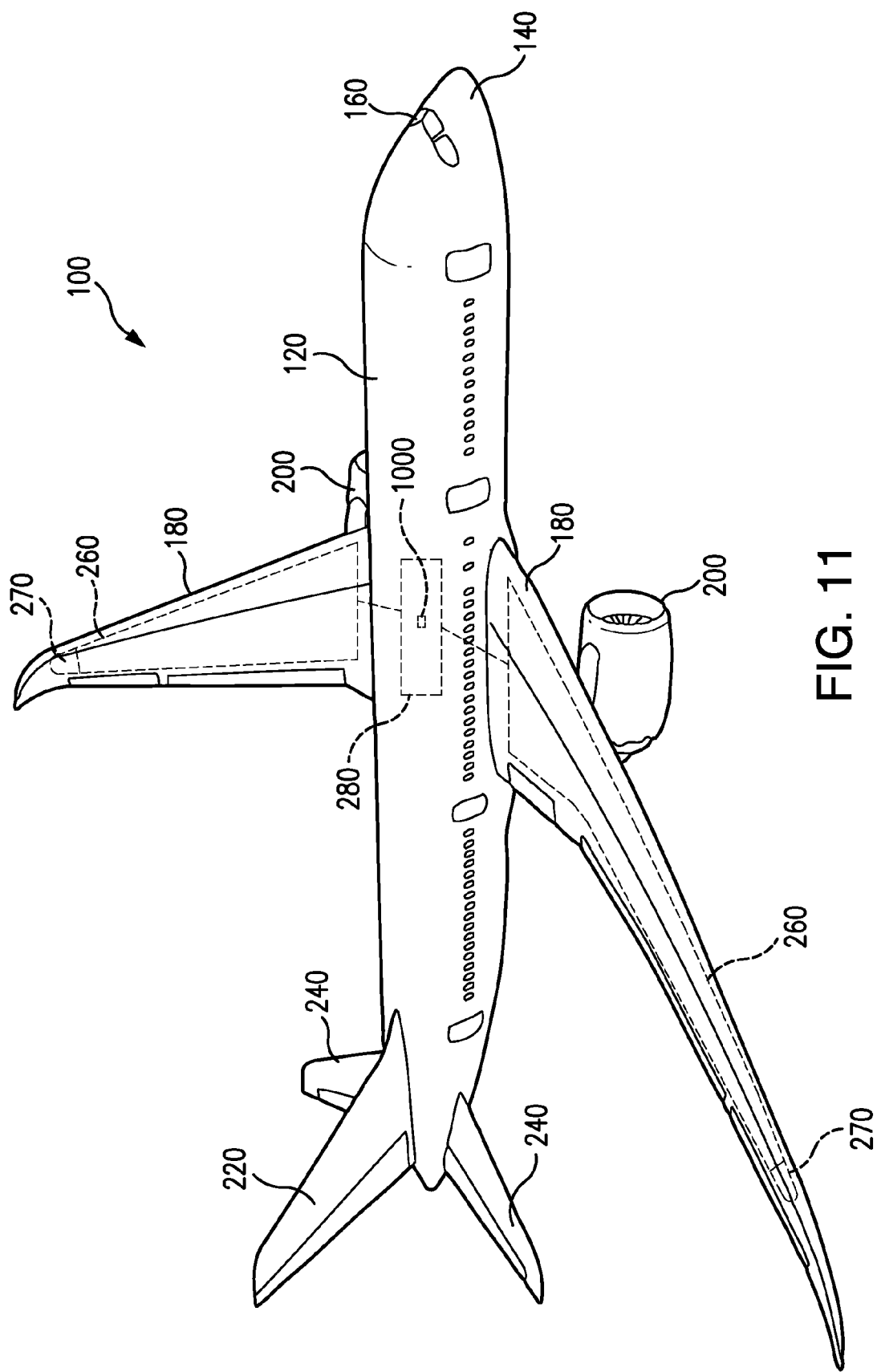
FIG. 11 is an illustration of a perspective view of an aircraft which can use an apparatus for heat or heat and mass transfer or a gas separation assembly of this invention.

As an illustration, at least one heat or heat and mass exchange apparatus and process disclosed herein is used in an aircraft that also includes a fluid separation assembly and/or method such as described above. Shown in FIG. 11, for instance, is aircraft 100, including frame or fuselage 120, nose 140, cockpit 160, wings 180, operatively coupled to the frame or fuselage 120, one or more propulsion units 200, a tail vertical stabilizer 220, and one or more tail horizontal stabilizers 240, fuel tanks 260, fuel tank vents 270 and heat exchanger for cabin air cooling system 280. The heat or heat and mass exchange apparatus described herein can be positioned in compartment 280 of the aircraft shown in FIG. 11. The air directed into the cabin is cooled by contact with a refrigerated fluid. The heat exchange processes between air and the refrigerated hydraulic fluid such as, for instance, ethylene glycol or propylene glycol, takes place in the apparatus shown in FIG. 6. The hot feed air is cooled through contact with the refrigerated hydraulic fluid. The cooling fluid is introduced into the bore side of the hollow fiber device at an elevated high pressure, while the air is introduced on the shell side at a low, substantially atmospheric pressure. The moisture laden air is cooled by the hydraulic fluid by transferring the excess heat through hollow fiber walls into the cooling fluid. Any water vapor condensed on the shell side during the heat transfer is removed together with the cooled air through the product port as droplets or mist or alternatively is separated from the cooled air and is removed through a separate liquid drainage port provided in the housing.

While this invention has been particularly shown and described with references to preferred embodiments thereof, it will be understood by those skilled in the art that various changes in form and details may be made therein without departing from the scope of the invention encompassed by the appended claims.

What is claimed is:
1. A fluid separation apparatus comprising:
   a) a cartridge including a hollow fiber membrane bundle, comprising a plurality of hollow fibers arranged around a substantially tubular core member, a first tubesheet and a second tubesheet encapsulating respective distal ends of the hollow fiber bundle, said tubesheets having, respectively, first boreholes formed radially in the first tubesheet and second boreholes formed radially in the second tubesheet, wherein the first boreholes and the second boreholes are in fluid communication with bores of the hollow fiber membranes;
   b) a housing surrounding the cartridge, wherein the housing has:
      i. a first port for introducing a feed fluid, the first port being in fluid communication with the first boreholes;
      ii. a second port for removal of non-permeate portion of the feed fluid, the second port being in fluid communication with the second boreholes; and iii. a third port for removal of permeate fluid from a shell side of hollow fiber membranes, wherein at least one of the first boreholes or at least one of the second boreholes is directly connected by perforations with an interior of the substantially tubular core member.

2. The apparatus of claim 1 wherein the feed fluid is a gas mixture.

3. The apparatus of claim 2 wherein the gas mixture is compressed air.

4. The apparatus of claim 1, wherein the hollow fiber membranes are asymmetric or composite.

5. The apparatus of claim 3, wherein compressed air is separated into nitrogen enriched for the non-permeated portion and oxygen enriched for the permeate fluid.

6. The apparatus of claim 5, wherein the apparatus generates the nitrogen enriched air on board aircraft.

7. The apparatus of claim 1, wherein the core member is hollow and has one or more openings formed in a wall thereof to provide a fluid communication conduit.

8. The apparatus of claim 1 wherein the hollow fibers are arranged around said core member by helical winding.

9. The apparatus of claim 8, wherein the hollow fibers are deposited at a wind angle within the range of from about 5° to about 6020 .

10. The apparatus of claim 8 wherein the hollow fibers are wound at a lower wind angle in a section of the bundle being encapsulated by the terminal tubesheets, as compared to the wind angle of hollow fibers in a section of the bundle disposed between the terminal tubesheets.

11. The apparatus of claim 1, wherein the first boreholes or the second boreholes are cylindrical, elliptical or oval.

12. The apparatus of claim 11, wherein the first boreholes or the second boreholes are formed at an angle to the surface of the tubesheet.

13. The apparatus of claim 1, wherein the flow direction of the permeate fluid is substantially axial and countercurrent to the flow direction of the fluid in the hollow fiber bores.

14. An aircraft comprising the apparatus of claim 1.

15. The apparatus of claim 1, wherein:
said first tubesheet is provided with a first pair of aligned circumferential grooves adapted and configured to receive a first pair of O-ring seals;
a diameter of said first tubesheet is reduced in a portion of said first tubesheet in between the grooves of said first pair in comparison to remaining portions of said first tubesheet; and
said first boreholes emerge at a surface of said first tubesheet in the reduced diameter portion of said first tubesheet.

16. The apparatus of claim 15, wherein:
said second tubesheet is provided with a first pair of aligned circumferential grooves adapted and configured to receive a second pair of O-ring seals;
a diameter of said second tubesheet is reduced in a portion of said second tubesheet in between the grooves of said second pair in comparison to remaining portions of said second tubesheet; and
said second boreholes emerge at a surface of said second tubesheet in the reduced diameter portion of said second tubesheet.

17. The apparatus of claim 1, wherein said first boreholes comprise a plurality of aligned rows of boreholes.

18. The apparatus of claim 17, wherein said second boreholes comprise a plurality of aligned rows of boreholes.

19. The apparatus of claim 1, wherein diameters of said first boreholes are wider closer to an exterior of said first tubesheet and narrower closer to an interior of said first tubesheet.

20. The apparatus of claim 1, wherein diameters of said second boreholes are wider closer to an exterior of said second tubesheet and narrower closer to an interior of said second tubesheet.

21. A hollow fiber device comprising:
a hollow fiber bundle formed around a central substantially tubular core member, including a plurality of hollow fiber membranes, a first tubesheet and a second tubesheet encapsulating respective distal ends of the hollow fiber bundle, the first tubesheet and the second tubesheet having, respectively, first boreholes formed radially in the first tubesheet and second boreholes formed radially in the second tubesheet, wherein the first and the second boreholes are in fluid communication with bores of the hollow fiber membranes, and wherein at least one of the first boreholes or the second boreholes is directly connected by perforations with a hollow interior of the central substantially tubular core member.

22. A process for gas separation, the process comprising:
a) directing a feed gas mixture to a bore side of a hollow fiber bundle that contains a plurality of hollow fiber membranes arranged around a core member, wherein the feed gas mixture is introduced through the core member, the core member being directly connected by perforations to first boreholes formed radially in a first tubesheet at a first end of the hollow fiber bundle, said first boreholes being in fluid communication with bores of the hollow fiber membranes;
b) separating more permeable components of the feed gas by permeation through the hollow fiber membranes;
c) recovering a fraction of less permeable gas components from the core member, the core member being directly connected by perforations to second boreholes formed radially in the second tubesheet at a second end of the hollow fiber bundle, said second boreholes being in fluid communication with bores of the hollow fibers; and
d) recovering a fraction of more permeable components of the feed gas from a shell side of the hollow fiber bundle.

23. The process of claim 22, wherein the gas separation process is air separation process.

24. The process of claim 23, wherein a non-permeate gas is nitrogen enriched air and a permeate gas is oxygen enriched air.

25. The process of claim 24, wherein the nitrogen enriched air is directed into fuel tank on board aircraft.

* * * * *